(12) United States Patent
Murakami

(10) Patent No.: US 11,609,434 B2
(45) Date of Patent: Mar. 21, 2023

(54) SPECTROMETER MODULE

(71) Applicant: HAMAMATSU PHOTONICS K.K., Hamamatsu (JP)

(72) Inventor: Kazumasa Murakami, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 11 days.

(21) Appl. No.: 17/140,362

(22) Filed: Jan. 4, 2021

(65) Prior Publication Data

US 2021/0208413 A1 Jul. 8, 2021

(30) Foreign Application Priority Data

Jan. 7, 2020 (JP) .............................. JP2020-000938
Oct. 9, 2020 (JP) .............................. JP2020-171145

(51) Int. Cl.
G01J 3/02 (2006.01)
G01J 3/36 (2006.01)
G02B 27/10 (2006.01)
G02B 7/00 (2021.01)

(52) U.S. Cl.
CPC ........ *G02B 27/1013* (2013.01); *G01J 3/0205* (2013.01); *G01J 3/36* (2013.01); *G02B 7/006* (2013.01)

(58) Field of Classification Search
CPC ....... G01J 2003/1213; G01J 2003/1221; G01J 2003/123; G01J 2003/1239; G01J 3/0205; G01J 3/0256; G01J 3/0262; G01J 3/0291; G01J 3/2803; G01J 3/36; G02B 27/1013; G02B 7/006
See application file for complete search history.

(56) References Cited

U.S. PATENT DOCUMENTS

| 7,382,456 | B2 | 6/2008 | Tixier et al. |
| 8,633,440 | B2 * | 1/2014 | Knapp ................. G02B 6/2938 250/338.1 |
| 11,248,957 | B2 | 2/2022 | Murakami et al. |
| 2007/0195310 | A1 | 8/2007 | Kanda |
| 2019/0035839 | A1 * | 1/2019 | Byun ................ H01L 27/14645 |

FOREIGN PATENT DOCUMENTS

JP 2013-532293 A 8/2013
WO WO-2012/003395 A2 1/2012

* cited by examiner

*Primary Examiner* — Hina F Ayub
(74) *Attorney, Agent, or Firm* — Faegre Drinker Biddle & Reath LLP

(57) ABSTRACT

In a spectroscopic module, a light shielding member is disposed between a plurality of bandpass filters and a light detector. The light shielding member includes a plurality of wall portions. The plurality of wall portions are arranged along an X direction with a light passage opening interposed therebetween, each of a plurality of optical paths from the plurality of bandpass filters to a plurality of light receiving regions passing through the light passage opening. A first wall portion and a second wall portion adjacent to each other among the plurality of wall portions are in contact with the bandpass filter, the bandpass filter corresponding to the light passage opening between the first wall portion and the second wall portion. A width in a Y direction of the light passage opening is larger than a width in the Y direction of the bandpass filter.

15 Claims, 17 Drawing Sheets

SPECTROMETER MODULE

TECHNICAL FIELD

The present disclosure relates to a spectroscopic module.

BACKGROUND

As a spectroscopic module that splits measurement light into light in a plurality of wavelength bands to detect the light in each of the wavelength bands, Japanese Unexamined Patent Publication (Translation of PCT Application) No. 2013-532293 discloses a device including a plurality of beam splitters, a plurality of bandpass filters facing the plurality of beam splitters, a plurality of light detection elements that are disposed on a side opposite the plurality of beam splitters facing the plurality of bandpass filters, and a casing that accommodates these components. In the device described in Japanese Unexamined Patent Publication No. 2013-532293, a support baffle having a plurality of openings is disposed between the plurality of bandpass filters and the plurality of light detection elements, and a plurality of optical paths from the plurality of bandpass filters to the plurality of light detection elements pass through the plurality of openings, respectively. Accordingly, in the device, the occurrence of crosstalk of light between the optical paths adjacent to each other is prevented.

SUMMARY

In the device described above, when the support baffle is made thicker, each of the plurality of optical paths from the plurality of bandpass filters to the plurality of light detection elements is lengthened, and the S/N ratio of an electric signal output from each of the light detection elements may decrease, which is a problem. On the other hand, when the support baffle is made thinner, a space in each of the openings of the support baffle is narrowed, and for example, when the light detection element is disposed in the space and adhesive agent is used to fix each of the light detection elements, the concentration of outgas emitted from the adhesive agent may increase, so that a light receiving region of each of the light detection elements may deteriorate, which is a problem.

An object of the present disclosure is to provide a spectroscopic module capable of suppressing a deterioration of a plurality of light receiving regions while improving the S/N ratio.

According to one aspect of the present disclosure, there is provided a spectroscopic module including: a plurality of beam splitters that are arranged along a first direction; a plurality of bandpass filters that are disposed on one side in a second direction intersecting the first direction with respect to the plurality of beam splitters, each of the plurality of bandpass filters facing each of the plurality of beam splitters; a light detector that is disposed on the one side in the second direction with respect to the plurality of bandpass filters and includes a plurality of light receiving regions, each of the plurality of light receiving regions facing each of the plurality of bandpass filters; and a light shielding portion that is disposed between the plurality of bandpass filters and the light detector. The light shielding portion includes a plurality of wall portions that are arranged along the first direction with a light passage space interposed therebetween, each of a plurality of optical paths from the plurality of bandpass filters to the plurality of light receiving regions passing through the light passage space. A first wall portion and a second wall portion adjacent to each other among the plurality of wall portions are in contact with a bandpass filter among the plurality of bandpass filters, the bandpass filter corresponding to the light passage space between the first wall portion and the second wall portion. A width of the light passage space in a third direction intersecting both the first direction and the second direction is larger than a width in the third direction of the bandpass filter.

DETAILED DESCRIPTION

Figure 1:
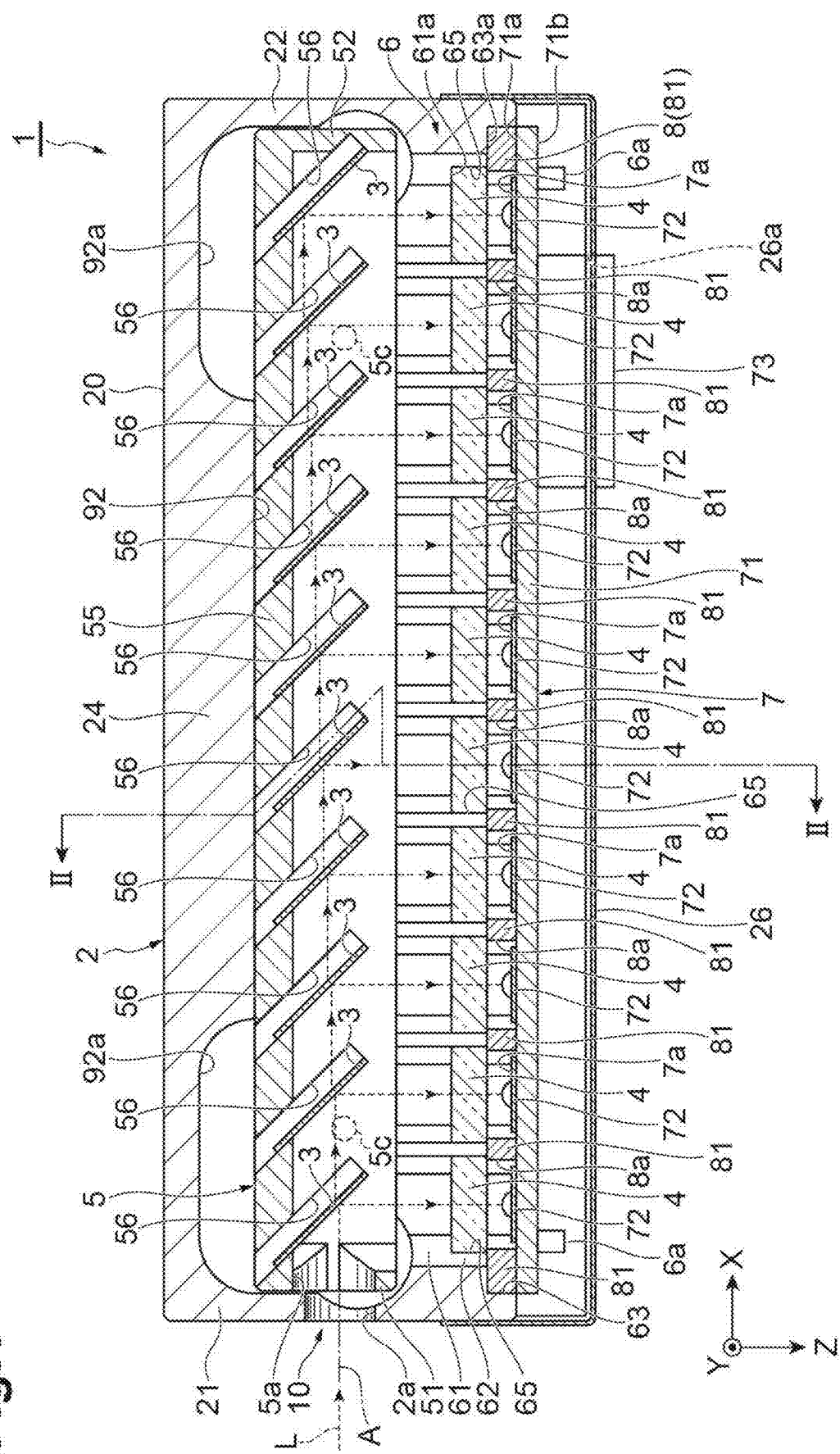
FIG. 1 is a cross-sectional view of a spectroscopic module of a first embodiment.

Hereinafter, an embodiment of the present disclosure will be described in detail with reference to the drawings. Incidentally, in the drawings, the same or equivalent portions are denoted by the same reference signs, and duplicated descriptions will be omitted. [First embodiment]

Figure 2:
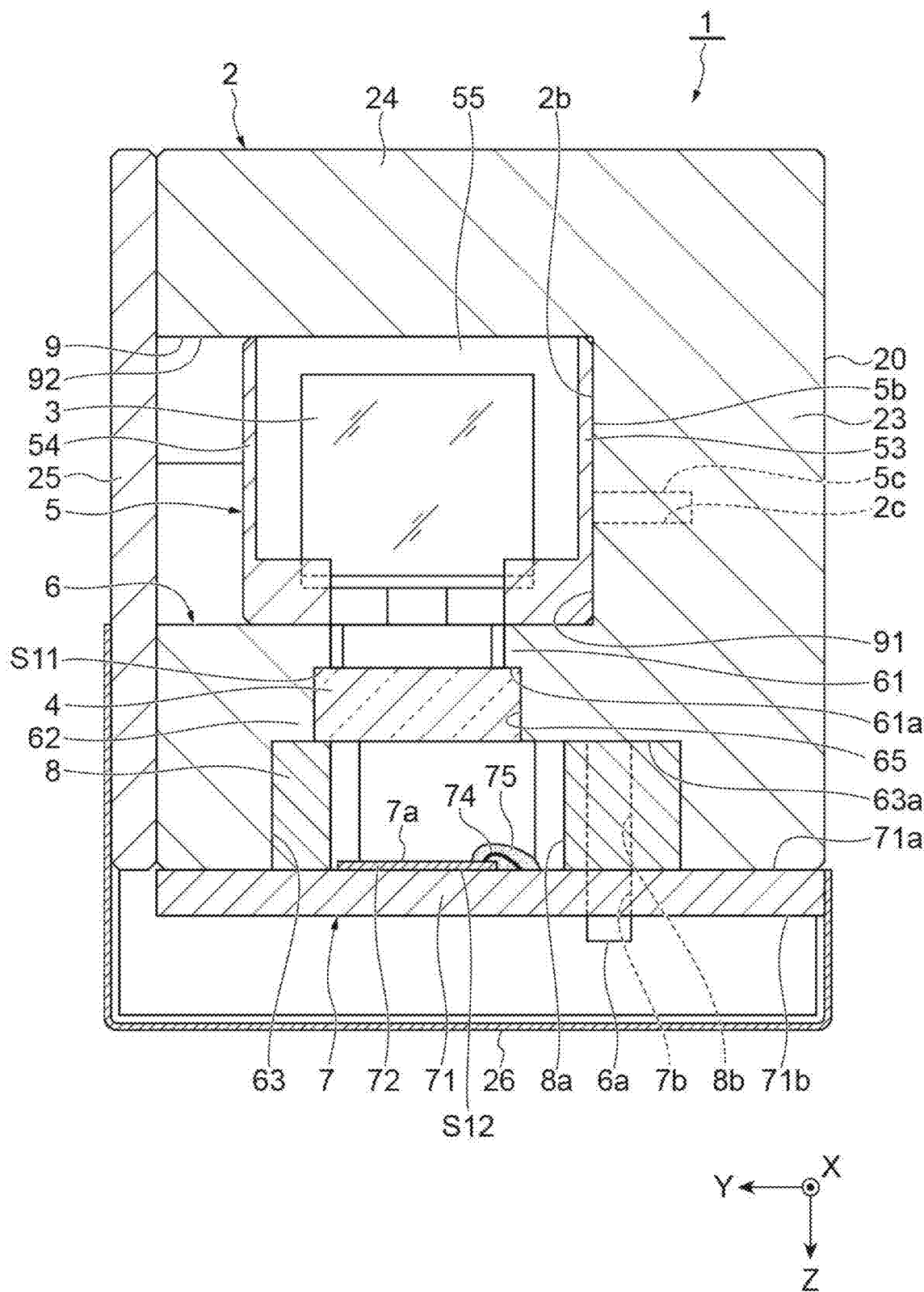
FIG. 2 is a cross-sectional view along line II-II illustrated in FIG. 1.

As illustrated in FIGS. 1 and 2, a spectroscopic module 1 is a spectrometer module which includes a casing 2, a plurality of beam splitters 3, a plurality of bandpass filters 4, a first support body 5, a second support body (support body) 6, a light detector 7, and a light shielding member (light shielding portion) 8. The plurality of beam splitters 3 are arranged along an X direction (first direction). The plurality of bandpass filters 4 are disposed on one side in a Z direction perpendicular to the X direction (second direction intersecting the first direction) with respect to the plurality of beam splitters 3. The light detector 7 is disposed on the one side in the Z direction with respect to the plurality of bandpass filters 4. The light detector 7 includes a plurality of light receiving regions 7a.

Each of the beam splitters 3 is, for example, a half mirror, and reflects a part of light, which is incident along the X direction, to the one side in the Z direction and transmits light, which is other than the part of the incident light, to one side in the X direction. Each of the bandpass filters 4 faces each of the beam splitters 3 in the Z direction, and transmit light in a predetermined wavelength band of the light, which is incident from the beam splitters 3 along the Z direction, to the one side in the Z direction. The bandpass filters 4 each transmit light in different wavelength bands. Each of the light receiving regions 7a faces each of the bandpass filters 4 in the Z direction, and detect the light incident from the bandpass filters 4 along the Z direction. The light receiving regions 7a form different light detection channels, respectively. In the spectroscopic module 1, measurement light L is split into light in a plurality of wavelength bands by the plurality of beam splitters 3 and the plurality of bandpass filters 4, and the light in each of the wavelength bands is detected by the light detector 7.

The beam splitters 3 are, for example, dichroic mirrors, and reflect light in a detection wavelength band at a reflectance of 90% or more to efficiently guide the light to the bandpass filters 4, respectively. Meanwhile, the dichroic mirrors also reflect light in a non-detection wavelength band at a reflectance of approximately 10% to guide the light to the bandpass filters 4, respectively. Here, if each of the bandpass filters 4 is not provided, since the ratio for detection of the light in the non-detection wavelength band in the light detector 7 is dependent on the reflectance of the dichroic mirror and is approximately 10%, the light shielding performance for the light in the non-detection wavelength band is not sufficiently exhibited, and selective wavelength detection is difficult. On the other hand, if each of the bandpass filters 4 is provided, since each of the bandpass filters 4 has a characteristic that the transmittance of the light in the non-detection wavelength band is 0.01% or less, the ratio for detection of the light in the non-detection wavelength band in the light detector 7 also is 0.01% or less. Therefore, in the spectroscopic module 1 including the bandpass filters 4, the light shielding performance for the light in the non-detection wavelength band is sufficiently exhibited, and selective wavelength detection is possible. Incidentally, the production of a beam splitter having a non-detection wavelength band of 0.01% or less is technically feasible, but is not realistic from the viewpoint of cost.

As illustrated in FIGS. 1 and 2, the casing 2 is a housing which accommodates the plurality of beam splitters 3, the plurality of bandpass filters 4, the first support body 5, the second support body 6, the light detector 7, and the light shielding member 8. The casing 2 includes a main body portion 20. The main body portion 20 is formed of a first wall portion 21, a second wall portion 22, a third wall portion 23, and a fourth wall portion 24. The first wall portion 21 and the second wall portion 22 face each other in the X direction. The second wall portion 22 is located on the one side in the X direction with respect to the first wall portion 21. The third wall portion 23 is located on one side in a Y direction perpendicular to both X direction and the Z direction with respect to the first wall portion 21 and the second wall portion 22. The fourth wall portion 24 is located on the other side (side opposite the one side) in the Z direction with respect to the first wall portion 21, the second wall portion 22, and the third wall portion 23.

A first light incident hole 2a through which the measurement light L is incident into the casing 2 along the X direction is formed in the first wall portion 21. An inner surface 2b parallel to both the X direction and the Z direction is formed in the third wall portion 23. Each of a plurality of positioning holes 2c formed in the third wall portion 23 is open to the inner surface 2b. The third wall portion 23 is integrally formed with the second support body 6. The main body portion 20 and the second support body 6 form a recessed portion 9 having the inner surface 2b of the third wall portion 23 as a bottom surface 91. Namely, the casing 2 defines the recessed portion 9 having the inner surface 2b of the third wall portion 23 as the bottom surface 91. The main body portion 20 and the second support body 6 are integrally formed from, for example, metal.

The casing 2 further includes a cover portion 25 and a shield cover 26. The cover portion 25 is attached to the main body portion 20 and the second support body 6 to close an opening of the recessed portion 9. The shield cover 26 is attached to the main body portion 20 and the cover portion 25 to cover the light detector 7 from the one side in the Z direction.

As illustrated in FIGS. 1 and 2, the first support body 5 supports the plurality of beam splitters 3. Each of the beam splitters 3 has a plate shape and has a thickness of 1 mm or less. Each of the beam splitters 3 has a long shape when seen in a thickness direction of each of the beam splitters 3, and a direction perpendicular to a longitudinal direction of each of the beam splitters 3 is a direction parallel to the Y direction. The beam splitters 3 each have the same shape. Each of the beam splitters 3 has, for example, a rectangular plate shape.

The first support body 5 is formed of a first wall portion 51, a second wall portion 52, a third wall portion 53, a fourth wall portion 54, and a fifth wall portion 55. The first wall portion 51 and the second wall portion 52 face each other in the X direction. The second wall portion 52 is located on the one side in the X direction with respect to the first wall portion 51. The third wall portion 53 and the fourth wall portion 54 face each other in the Y direction. The third wall portion 53 is located on the one side in the Y direction with respect to the first wall portion 51 and the second wall portion 52. The fourth wall portion 54 is located on the other side in the Y direction with respect to the first wall portion 51 and the second wall portion 52. The fifth wall portion 55 is located on the other side in the Z direction with respect to the first wall portion 51, the second wall portion 52, the third wall portion 53, and the fourth wall portion 54. The first support body 5 is integrally formed from, for example, metal.

A second light incident hole 5a through which the measurement light L is incident on the plurality of beam splitters 3 along the X direction is formed in the first wall portion 51. An outer surface 5b parallel to both the X direction and the Z direction is formed in the third wall portion 53. The outer surface 5b is provided with a plurality of positioning pins 5c. The first support body 5 is attached to the third wall portion 23 such that the outer surface 5b is in contact with the inner surface 2b of the casing 2 in a state where each of the positioning pins 5c is fitted into each of the positioning holes 2c of the casing 2, to define the position of the first support body 5 in a plane (along the plane) parallel to both the X direction and the Z direction.

The first support body 5 is disposed in the recessed portion 9 in a state where the outer surface 5b is in contact with the inner surface 2b of the casing 2 (namely, the bottom surface 91 of the recessed portion 9). A side surface 92 of the recessed portion 9 includes a plurality of separation regions 92a. Each of the separation regions 92a is separated from the first support body 5. In the present embodiment, the side surface 92 is formed of inner surfaces of the first wall portion 21, the second wall portion 22, and the fourth wall portion 24 of the main body portion 20 and a surface of the second support body 6, the surface being on the fourth wall portion 24 side. Incidentally, the side surface 92 may include at least one separation region 92a. In addition, the separation region 92a may be the entirety of the side surface 92.

A plurality of grooves 56 are formed in the first support body 5. Each of the beam splitters 3 is disposed in each of the grooves 56. Accordingly, the first support body 5 is provided with a plurality of sets of the grooves 56 and the beam splitters 3. Hereinafter, each of the plurality of sets is referred to as a "corresponding groove 56 and beam splitter 3".

Figure 3:
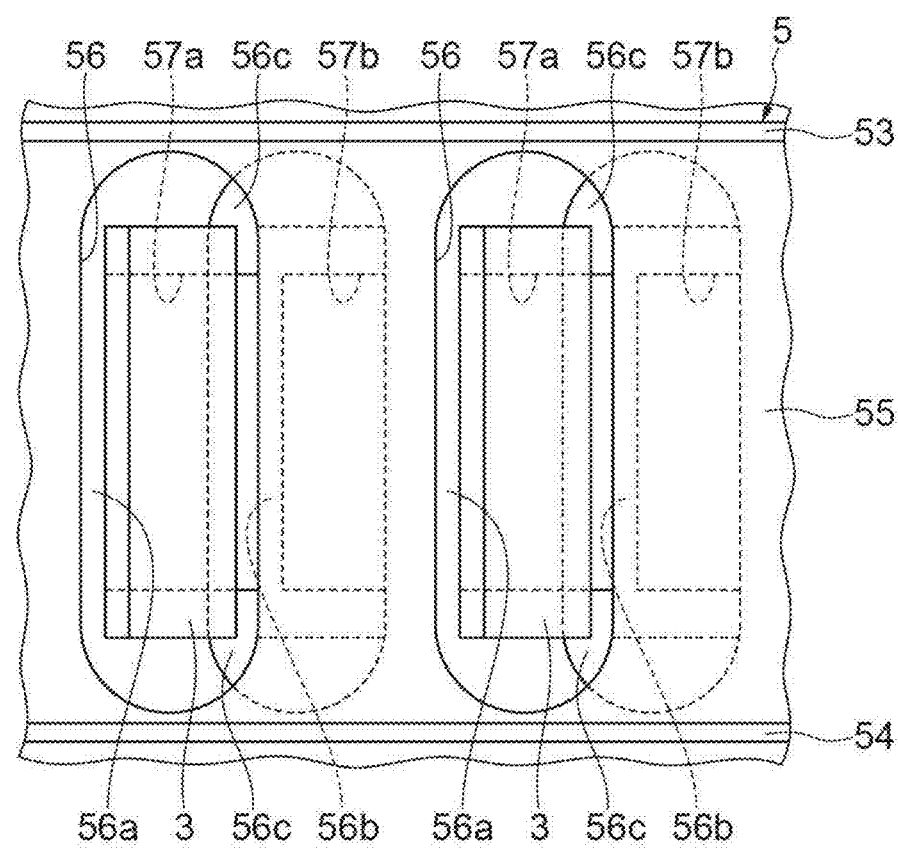
FIG. 3 is a plan view of a portion of a first support body illustrated in FIG. 1.

As illustrated in FIGS. 1 and 3, each of the grooves 56 is open to an outer surface of the fifth wall portion 55. An extending direction of each of the grooves 56 is a direction parallel to the Y direction. A depth direction of each of the grooves 56 is a direction which is inclined by 45° such that the deeper the groove 56 is, the closer to the one side in the X direction the groove 56 is located, among directions perpendicular to the Y direction. Each of the grooves 56 has a pair of side surfaces 56a and 56b and a bottom surface 56c. The pair of side surfaces 56a and 56b face each other in a width direction (direction perpendicular to both extending direction and the depth direction) of each of the grooves 56. A light passage opening 57a is formed in the side surface 56a and a light passage opening 57b is formed in the side surface 56b.

In the present embodiment, each of the grooves 56 is formed such that both end portions in the extending direction of the groove 56 are located in the third wall portion 53 and the fourth wall portion 54, respectively. The side surface 56a is cut out by a space between the third wall portion 53 and the fourth wall portion 54 facing each other in the Y direction, so that the light passage opening 57a is formed in the side surface 56a. The side surface 56b is cut out by the space, so that the light passage opening 57b is formed in the side surface 56b. In addition, the bottom surface 56c is separated into two regions in the Y direction.

In the corresponding groove 56 and beam splitter 3, the groove 56 has a width (namely, a distance between the pair of the side surfaces 56a and 56b) twice or more the thickness of the beam splitter 3. As one example, the thickness of the beam splitter 3 is 0.5 mm, and the width of the groove 56 is 2.5 mm to 3.0 mm. In the corresponding groove 56 and beam splitter 3, the beam splitter 3 is disposed in the groove 56 to be in contact with the side surface 56a and the bottom surface 56c, the side surface 56a being located on the one side of the pair of side surfaces 56a and 56b in the Z direction. In this state, the beam splitter 3 is fixed to the side surface 56a and the bottom surface 56c with, for example, adhesive agent.

As illustrated in FIG. 1, in the spectroscopic module 1, a light incident portion 10 is formed of the first light incident hole 2a and the second light incident hole 5a. The light incident portion 10 defines light to be incident on the plurality of beam splitters 3 along the X direction. The second light incident hole 5a includes the first light incident hole 2a when seen in the X direction. In this case, a center line of the first light incident hole 2a is an optical axis A of the light incident portion 10. As one example, when seen in the X direction, the first light incident hole 2a has a circular shape, and the second light incident hole 5a has an oval shape having the Z direction as a longitudinal direction. As one example, when seen in the X direction, the first light incident hole 2a overlaps a portion on the one side in the Z direction of the second light incident hole 5a. Accordingly, when the beam splitters 3 are disposed in the first support body 5, the centers of the beam splitters 3 can be confirmed through the first light incident hole 2a and the second light incident hole 5a.

Figure 4:
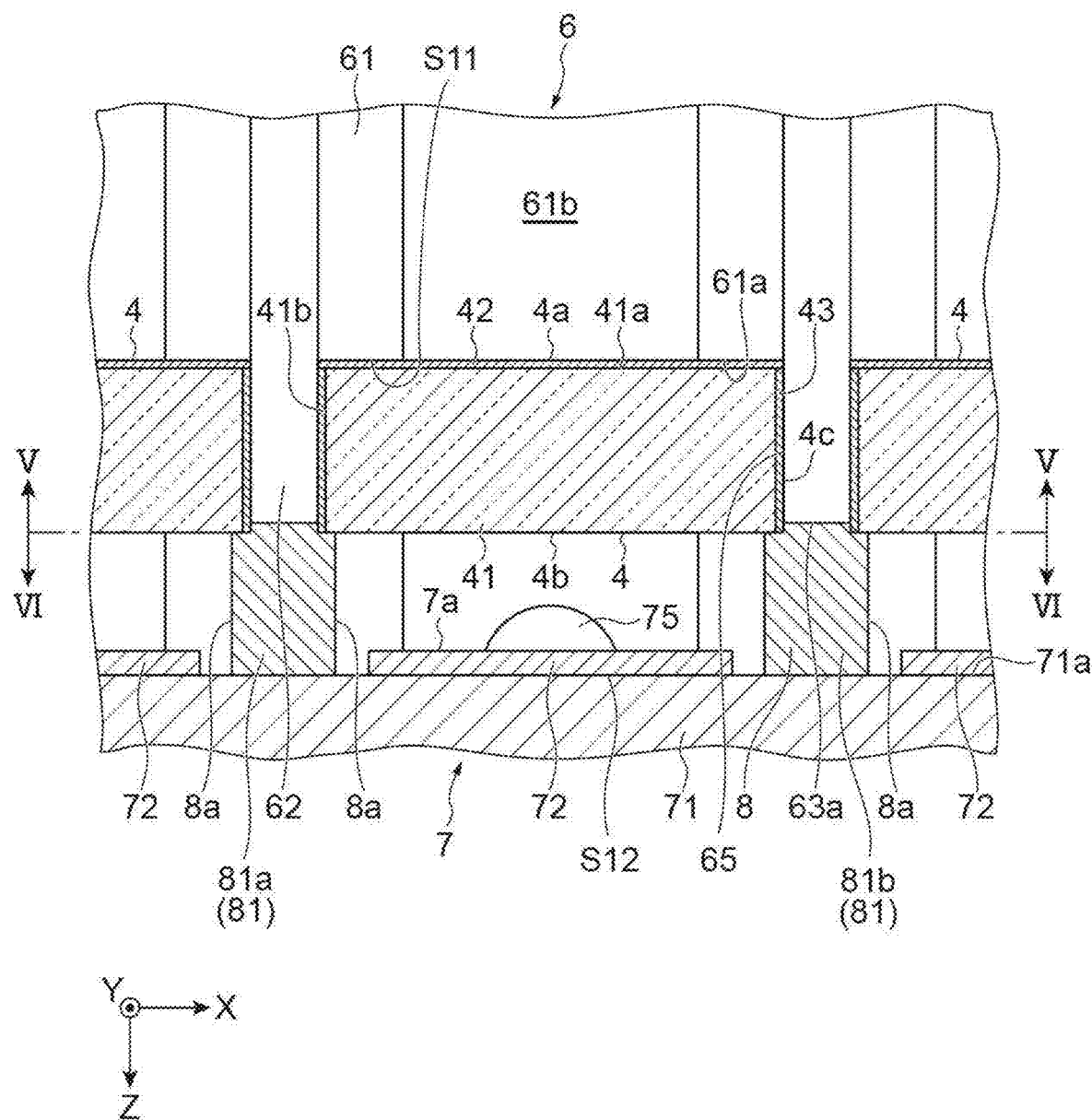
FIG. 4 is a cross-sectional view of a portion of a second support body illustrated in FIG. 1.
Figure 5:
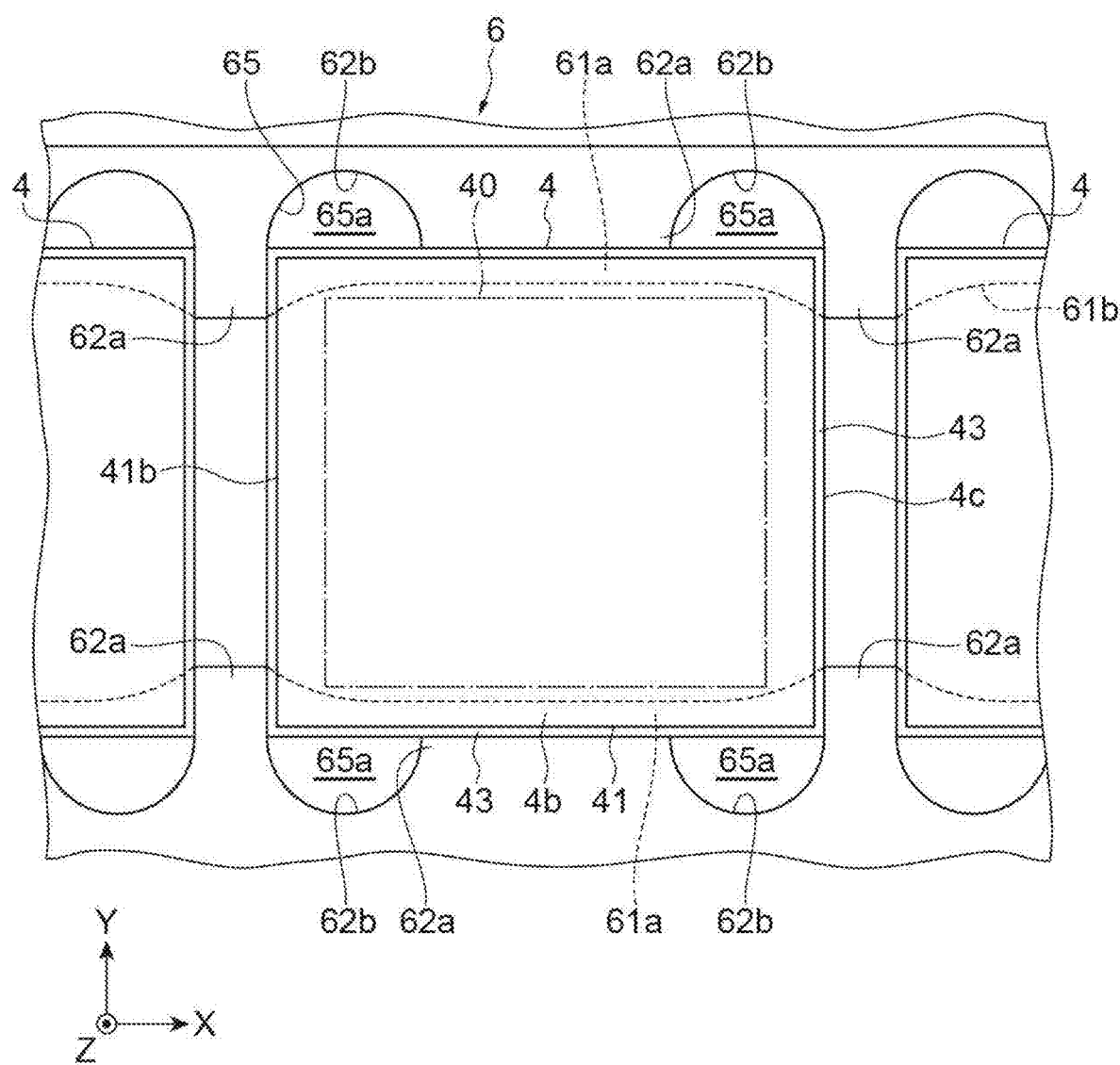
FIG. 5 is a cross-sectional view along line V-V illustrated in FIG. 4.

As illustrated in FIGS. 4 and 5, the second support body 6 supports the plurality of bandpass filters 4. Each of the bandpass filters 4 includes a light transmitting substrate 41, an interference film 42, and a light shielding film 43. The light transmitting substrate 41 has, for example, a rectangular plate shape. The interference film 42 is provided on a light incident surface 41a of the light transmitting substrate 41. The interference film 42 is, for example, a dielectric multilayer film. The light shielding film 43 is provided on a side surface 41b of the light transmitting substrate 41. The light shielding film 43 is, for example, a black paint film. In each of the bandpass filters 4, a surface on an opposite side of the interference film 42 from the light transmitting substrate 41 is a light incident surface 4a of the bandpass filter 4, a surface on an opposite side of the light transmitting substrate 41 from the interference film 42 is a light outgoing surface 4b of the bandpass filter 4, and an outer surface of the light shielding film 43 is a side surface 4c of the bandpass filter 4. Incidentally, in FIGS. 1 and 2, each of the bandpass filters 4 is illustrated in a state where the configuration is simplified.

The second support body 6 includes a support portion 61. A support surface 61a is formed in the support portion 61 so as to be open to the one side in the Z direction. The fact that the support surface 61a is open to the one side in the Z direction means that when the support portion 61 is seen from the one side in the Z direction in a state where there is only the second support body 6, the support surface 61a is exposed (namely, that the support surface 61a is visible). The plurality of bandpass filters 4 are disposed on the support surface 61a to be arranged along the X direction. Each of the bandpass filters 4 is fixed to the support surface 61a with adhesive agent S11. The support surface 61a is a surface perpendicular to the Z direction, and is formed in the support portion 61 such that a region on the light incident surface 4a of each of the bandpass filters 4 is in contact with the support surface 61a, the region being located outside a clear aperture 40. The clear aperture 40 is an effective opening region in which the function of the bandpass filter 4 is guaranteed. One light passage opening 61b through which a plurality of optical paths (dotted line illustrated in FIG. 1) from the plurality of beam splitters 3 to the plurality of bandpass filters 4 pass is formed in the support portion 61. Accordingly, the support surface 61a is separated into two regions in the Y direction.

The second support body 6 further includes a restriction portion 62. The restriction portion 62 is provided in the second support body 6 so as to be located on the one side in the Z direction with respect to the support portion 61. The restriction portion 62 restricts each of the bandpass filters 4 from moving in a direction perpendicular to the Z direction. The restriction portion 62 is formed of a plurality of contact portions 62a that are provided so as to be in contact with the side surface 4c of each of the bandpass filters 4, and a plurality of separation portions 62b that are provided so as to be separated from the side surface 4c of each of the bandpass filters 4. The restriction portion 62 does not completely partition the plurality of bandpass filters 4 off from each other. Namely, the plurality of bandpass filters 4 are separated from each other with a space interposed therebetween in a state where the movement thereof in the direction perpendicular to the Z direction is restricted by the restriction portion 62.

As illustrated in FIGS. 1 and 2, a recessed portion 63 which is open to the one side in the Z direction is formed in the second support body 6. A bottom surface 63a of the recessed portion 63 is a surface on an opposite side of the restriction portion 62 from the support portion 61. The distance between the support surface 61a and the bottom surface 63a in the Z direction is smaller than the thickness of each of the bandpass filters 4 (namely, a distance between the light incident surface 4a and the light outgoing surface 4b in the Z direction). Accordingly, a portion on an opposite side of each of the bandpass filters 4 from the support portion 61 protrudes from the bottom surface 63a, and the light outgoing surface 4b of each of the bandpass filters 4 is located on the one side in the Z direction from the bottom surface 63a (refer to FIG. 4). The bottom surface 63a is provided with a plurality of positioning pins (first engagement portion) 6a.

A plurality of recessed portions 65 which are open to the one side in the Z direction are formed in the bottom surface 63a of the recessed portion 63. A side surface of each of the recessed portions 65 is an inner surface of the restriction portion 62, and a bottom surface of each of the recessed portions 65 is the support surface 61a of the support portion 61. Each of the recessed portions 65 accommodates one bandpass filter 4.

As illustrated in FIG. 5, a plurality of separation spaces 65a are formed in the second support body 6 for with respect to each of the bandpass filters 4. Each of the separation spaces 65a is defined by the second support body 6 and the bandpass filter 4. Specifically, each of the separation spaces 65a is defined by an inner surface of the recessed portion 65 and the side surface 4c of the bandpass filter 4. In the present embodiment, each of the separation spaces 65a is defined by an inner surface of the separation portion 62b in the side surface of the recessed portion 65, an exposed surface in the bottom surface of the recessed portion 65 when seen from the one side in the Z direction, and the side surface 4c.

As illustrated in FIGS. 1 and 2, the light detector 7 includes a wiring substrate 71, a plurality of light detection elements 72, and a connector 73. The plurality of light detection elements 72 are mounted on a surface 71a to be arranged along the X direction, the surface 71a being on a plurality of bandpass filters 4 side of the wiring substrate 71. Each of the light detection elements 72 is fixed to the wiring substrate 71 with adhesive agent S12. Each of the light detection elements 72 is a discrete semiconductor element such as a PD chip, and has the light receiving region 7a. The connector 73 is attached to a surface 71b, the surface 71b being on an opposite side of the wiring substrate 71 from the surface 71a. The connector 73 is a port through which an electric signal or the like is input to and output from each of the light detection elements 72. The connector 73 extends outside the casing 2 through an opening 26a formed in the shield cover 26. The light detector 7 is attached to the second support body 6 so as to close an opening of the recessed portion 63. In the present embodiment, the wiring substrate 71 is attached to the second support body 6 to close the opening of the recessed portion 63, and the plurality of light detection elements 72 are disposed in the recessed portion 63.

The light shielding member 8 is disposed between the plurality of bandpass filters 4 and the light detector 7. The light shielding member 8 is made of an elastic material, and is disposed in the recessed portion 63 of the second support body 6 in a state where the light shielding member 8 is compressed. In this state, the plurality of bandpass filters 4 are held between the support portion 61 of the second support body 6 and the light shielding member 8. A surface on the plurality of bandpass filters 4 side of the light shielding member 8 is in contact with the light outgoing surface 4b of each of the bandpass filters 4. A surface on a light detector 7 side of the light shielding member 8 is in contact with the surface 71a of the wiring substrate 71.

Figure 6:
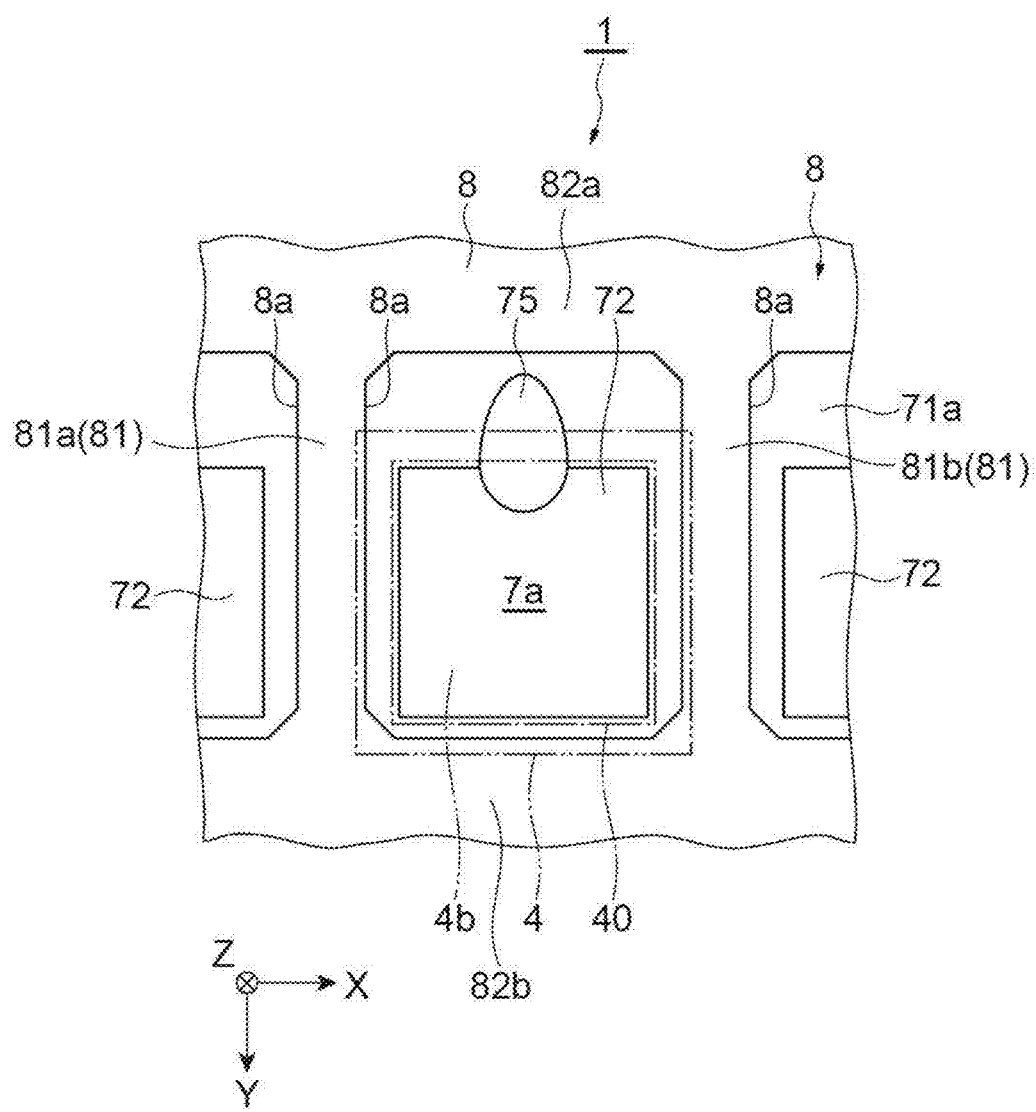
FIG. 6 is a cross-sectional view along line VI-VI illustrated in FIG. 4.

A plurality of light passage openings (light passage spaces) 8a are formed in the light shielding member 8. The light shielding member 8 includes a plurality of wall portions 81. As illustrated in FIGS. 1 and 6, the wall portions 81 are arranged along the X direction with the light passage opening 8a interposed therebetween. Namely, each of the plurality of wall portions 81 is arranged between the light passage openings 8a adjacent to each other. Each of a plurality of optical paths from the plurality of bandpass filters 4 to the plurality of light receiving regions 7a passes through each of the plurality of light passage openings 8a. Namely, the plurality of optical paths from the plurality of bandpass filters 4 to the plurality of light receiving regions 7a are separated from each other by the light shielding member 8. In the present embodiment, each of the light detection elements 72 of the light detector 7 is located inside each of the light passage openings 8a of the light shielding member 8. In each of the light passage openings 8a, a terminal of the light detection element 72 and a terminal of the wiring substrate 71 are electrically connected by a wire 74, and the wire 74 is covered with a resin member 75. As illustrated in FIG. 4, each of the light passage openings 8a is formed between the light outgoing surface 4b and the light receiving region 7a.

As illustrated in FIGS. 4 and 6, a first wall portion 81a and a second wall portion 81b adjacent to each other among the plurality of wall portions 81 are in contact with the bandpass filter 4 corresponding to the light passage opening 8a between the first wall portion 81a and the second wall portion 81b.

As illustrated in FIG. 6, the width in the Y direction of the light passage opening 8a is larger than the width in the X direction of the light passage opening 8a. Namely, the light passage opening 8a has a long shape having the Y direction as a longitudinal direction. In the present embodiment, the light passage opening 8a has a rectangular shape having the Y direction as a longitudinal direction. The width in the Y direction of the light passage opening 8a is a distance from a portion 82a to a portion 82b in the light shielding member 8, the portion 82a being located on the one side in the Y direction with respect to the first wall portion 81a and the second wall portion 81b, the portion 82b being located on the other side in the Y direction with respect to the first wall portion 81a and the second wall portion 81b. The width in the X direction of the light passage opening 8a is a distance from the first wall portion 81a to the second wall portion 81b in the X direction in the light shielding member 8. Each of the width in the X direction of the first wall portion 81a and the width in the X direction of the second wall portion 81b is smaller than the width in the X direction of the light passage opening 8a. Incidentally, in the specification, the expression that the width in the Y direction of the light passage opening 8a is larger than the width in the X direction of the light passage opening 8a means that when the light passage opening 8a corresponding to the Y direction and the light passage opening 8a corresponding to the X direction are overlapped in a state where the Y direction and the X direction are aligned with each other, a part of the light passage opening 8a corresponding to the Y direction protrudes in a direction in which the Y direction and the X direction are aligned with each other.

As illustrated in FIG. 6, the width in the Y direction of the light passage opening 8a is larger than the width in the Y direction of the bandpass filter 4. In the present embodiment, when seen in the Z direction, the first wall portion 81a and the second wall portion 81b are in contact with the bandpass filter 4 such that the light passage opening 8a is located on one side (specifically, a third wall portion 23 side) in the Y direction with respect to the bandpass filter 4. Incidentally, in the specification, the expression that the width in the Y direction of the light passage opening 8a is larger than the width in the Y direction of the bandpass filter 4 means that when the light passage opening 8a and the bandpass filter 4 are overlapped in the Y direction, a part of the light passage opening 8a protrudes in the Y direction.

The separation space 65a which is specific among the separation spaces 65a formed in the recessed portion 65 communicates with the light passage opening 8a of the light shielding member 8. Specifically, the separation space 65a communicating with the light passage opening 8a is open to the light passage opening 8a. In other words, at least a part of the separation space 65a communicating with the light passage opening 8a is continuous with a part of the light passage opening 8a, and overlaps a part of the light passage opening 8a when seen in the Z direction. For example, four separation spaces 65a are formed in each of the recessed portions 65, and among the four separation spaces 65a, two separation spaces 65a on the third wall portion 23 side are open to one light passage opening 8a.

As illustrated in FIG. 6, each of the light passage openings 8a is formed in the light shielding member 8 such that a region on the light outgoing surface 4b of each of the bandpass filters 4 is in contact with the light shielding member 8, the region being located outside the clear aperture 40. Namely, the light shielding member 8 is formed such that a region on the light outgoing surface 4b of each of the bandpass filters 4 is in contact with the light shielding member 8, the region being located outside the clear aperture 40. Incidentally, in FIG. 6, the bandpass filter 4 is illustrated with an alternate long and two short dashes line. Specifically, as illustrated in FIG. 6, the first wall portion 81a and the second wall portion 81b are in contact with a region on the light outgoing surface 4b of the bandpass filter 4, the region being located outside the clear aperture 40.

As illustrated in FIG. 2, a plurality of positioning holes (second engagement portion) 8b are formed in the light shielding member 8. A plurality of positioning holes 7b are formed in the wiring substrate 71. Each of the positioning holes 7b overlaps each of the positioning holes 8b when seen in the Z direction. The light shielding member 8 is disposed in the recessed portion 63 in a state where each of the positioning pins 6a of the second support body 6 is fitted into each of the positioning holes 8b, to define the position of each of the light passage openings 8a in the direction perpendicular to the Z direction. The light detector 7 is attached to the second support body 6 in a state where each of the positioning pins 6a which has penetrated through the positioning hole 8b of the light shielding member 8 is fitted into each of the positioning holes 7b, to define the position of each of the light receiving regions 7a in the direction perpendicular to the Z direction.

Figure 7:
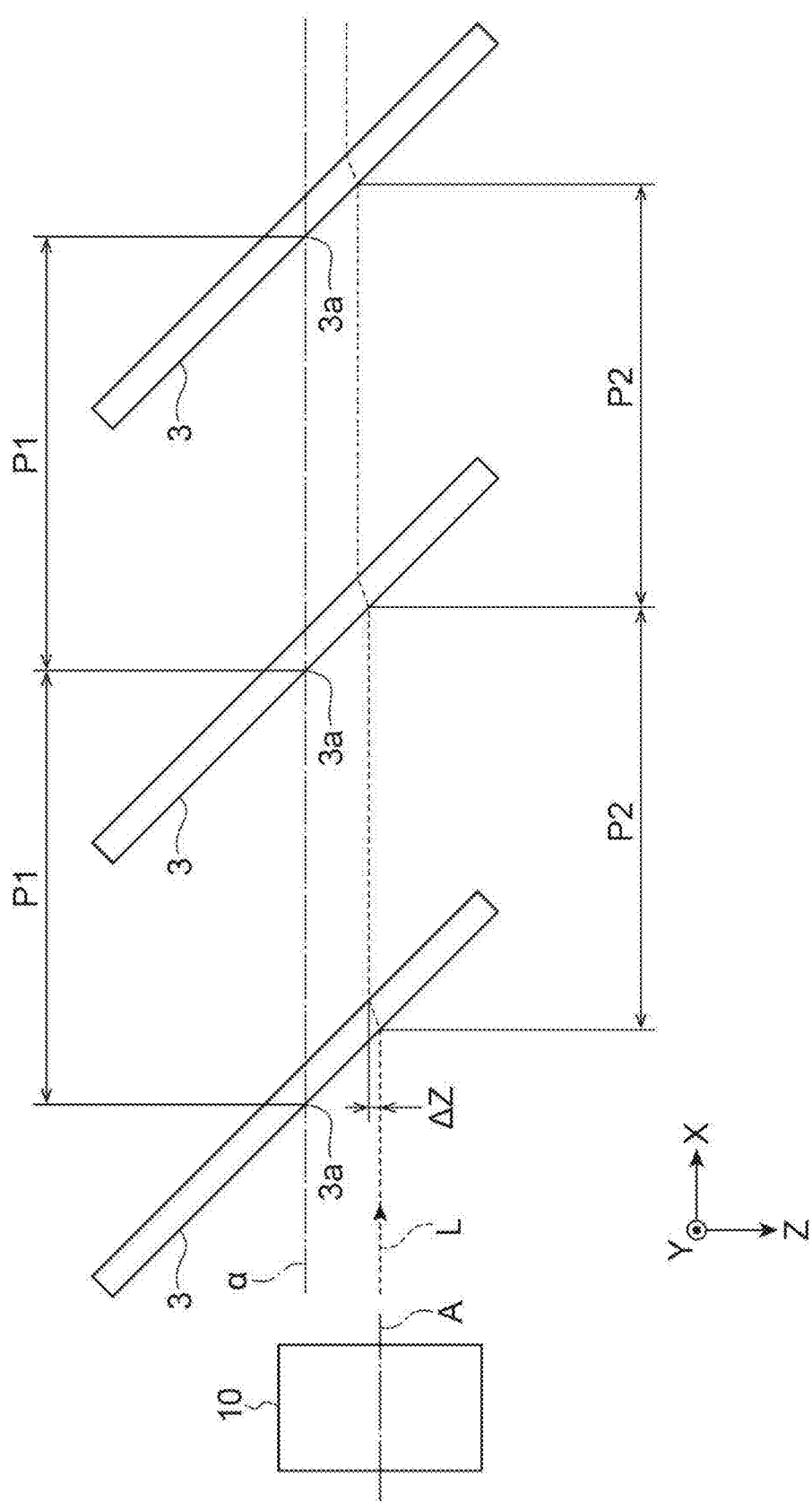
FIG. 7 is a view illustrating the dispositional relationship of a plurality of beam splitters with respect to the optical axis of a light incident portion.

As illustrated in FIG. 7, the plurality of beam splitters 3 are disposed such that a center 3a of each of the beam splitters 3 is located on a line α parallel to the X direction. The center 3a of the beam splitter 3 is the center (center of gravity) of the beam splitter 3 when seen in the thickness direction of the beam splitter 3. The beam splitters 3 each have the same thickness of 1 mm or less, and are disposed such that light is incident at an angle of incidence of 45° along the X direction. The optical axis A of the light incident portion 10 is located on the one side in the Z direction with respect to the line α passing through the center 3a of each of the beam splitters 3. Incidentally, in FIG. 7, the light incident portion 10 is schematically illustrated.

Since refraction of light occurs in each of the beam splitters 3, the optical axis of transmitted light is shifted to a side away from the optical axis A of the light incident portion 10 with respect to the optical axis of incident light. In the spectroscopic module 1, since the beam splitters 3 each have the same thickness and the beam splitters 3 each are disposed such that light is incident at an angle of incidence of 45° along the X direction, the beam splitters 3 each have the same amount of light refraction. The amount of light refraction means an amount by which the optical axis of the transmitted light is shifted to the side away from the optical axis A of the light incident portion 10 with respect to the optical axis of the incident light in the beam splitter 3.

When the amount of light refraction in each of the beam splitters 3 is $\Delta Z$ and the number of the beam splitters 3 is M, the distance between "the optical axis of light incident on the beam splitter 3 of the foremost stage" and "the optical axis of light incident on the beam splitter 3 of the rearmost stage" in the Z direction is $\Delta Z(M-1)$. The beam splitter 3 of the foremost stage means the beam splitter 3 disposed in the foremost stage (on an upstream side in a traveling direction of light), and the beam splitter 3 of the rearmost stage means the beam splitter 3 disposed in the rearmost stage (on a downstream side in the traveling direction of light).

In the spectroscopic module 1, the plurality of beam splitters 3 are disposed with respect to the optical axis A of the light incident portion 10 such that the distance between the optical axis A and the line α in the Z direction is $\Delta Z(M-1)/2$. Accordingly, in the beam splitter 3 disposed in a middle stage (on a midstream side in the traveling direction of light), the optical axis of incident light passes through the center 3a or the vicinity of the center 3a of the beam splitter 3.

As one example, when the thickness of each of the beam splitters 3 is 0.5 mm, the refractive index is 1.5, the angle of incidence to the beam splitter 3 is 45°, and the number of the beam splitters 3 disposed is 10, the value of an amount $\Delta Z$ of light refraction is 0.165 mm Therefore, the distance between the optical axis A and the line α in the Z direction is $\Delta Z(M-1)/2=0.165\times(10-1)/2$=approximately 0.74 mm. In this case, in each of the beam splitters 3 of a fifth stage and a sixth stage from the foremost stage, the optical axis of incident light passes through the vicinity of the center 3a of the beam splitter 3. When the diameter of the measurement light L which is defined by the light incident portion 10 (namely, the diameter of light incident on the beam splitter 3 of the foremost stage) is 4 mm, if the length in the longitudinal direction of each of the beam splitters 3 is 10 mm, the incident light is contained in the clear apertures in all the beam splitters 3.

In the spectroscopic module 1, the arrangement pitch of the plurality of beam splitters 3 is a value obtained by adding the amount of light refraction in each of the beam splitters 3 to the arrangement pitch of the plurality of light receiving regions 7a. The arrangement pitch of the plurality of beam splitters 3 means "a distance between the centers 3a of the beam splitters 3 adjacent to each other" when the plurality of beam splitters 3 are arranged at equal intervals along the X direction. The arrangement pitch of the plurality of light receiving regions 7a means "a distance between the centers of the light receiving regions 7a adjacent to each other" when the plurality of light receiving regions 7a are arranged at equal intervals along the X direction. When the arrangement pitch of the plurality of beam splitters 3 is P1 and the arrangement pitch of the plurality of light receiving regions 7a is P2, P1=P2+ΔZ. Therefore, when the number of the beam splitters 3 is M, the distance between "the beam splitter 3 of the foremost stage" and "the beam splitter 3 of the rearmost stage" in the X direction is P1(M−1)=(P2+ΔZ)(M−1)=P2(M−1)+ΔZ(M−1). As described above, the arrangement pitch of the plurality of beam splitters 3 is cumulatively affected by not only the arrangement pitch of the plurality of light receiving regions 7a but also the amount of light refraction in each of the beam splitters 3.

From the above viewpoint, "in the entirety of the plurality of beam splitters 3, the total accumulated amount of light refraction is sufficiently reduced on the side away from the bandpass filters 4 and on a rear stage side in a direction in which the plurality of beam splitters 3 are lined up, so that the size of the entirety of the module is reduced", each of the beam splitters 3 preferably has a thickness of 1 mm or less, and more preferably has a thickness of 0.5 mm or less. However, from the viewpoint that the strength of the beam splitter 3 is secured, it is preferable that each of the beam splitters 3 has a thickness of 0.1 mm or more.

In the second support body 6 of the spectroscopic module 1, the plurality of bandpass filters 4 are disposed on the support surface 61a that is formed in the support portion 61 so as to be open to the one side in the Z direction. Here, in the second support body 6, the one side in the Z direction is a side opposite a side on which the plurality of beam splitters 3 are supported. For this reason, during production of the spectroscopic module 1, for example, even when damage or the like is found in the bandpass filter 4 after the first support body 5 which supports the plurality of beam splitters 3 is attached to the second support body 6, the removal of the first support body 5 from the second support body 6 for the replacement of the bandpass filter 4 is not required. In addition, the timing when the plurality of bandpass filters 4 are attached to the second support body 6 is not dependent on the timing when the first support body 5 which supports the plurality of beam splitters 3 is attached to the second support body 6. Further, when the plurality of bandpass filters 4 are attached to the second support body 6, each of the bandpass filters 4 is visible from the one side in the Z direction. As a result, according to the spectroscopic module 1, the production efficiency can be improved.

In addition, in the spectroscopic module 1, the second support body 6 is provided with the restriction portion 62 that restricts each of the bandpass filters 4 from moving in the direction perpendicular to the Z direction. Accordingly, the positional accuracy of each of the bandpass filters 4 can be secured even without using, for example, the adhesive agent S11 or the like.

In addition, in the spectroscopic module 1, the restriction portion 62 is formed of the plurality of contact portions 62a that are provided so as to be in contact with the side surface 4c of each of the bandpass filters 4, and the plurality of separation portions 62b that are provided so as to be separated from the side surface 4c of each of the bandpass filters 4. Accordingly, during production of the spectroscopic module 1, when damage or the like is found in the bandpass filter 4, for example, the bandpass filter 4 can be easily removed from the second support body 6 by inserting a jig between the bandpass filter 4 and the separation portions 62b.

In addition, in the spectroscopic module 1, the one light passage opening 61b through which the plurality of optical paths from the plurality of beam splitters 3 to the plurality of bandpass filters 4 pass is formed in the support portion 61. Accordingly, the structure of the support portion 61 can be simplified.

In addition, in the spectroscopic module 1, the support surface 61a is formed in the support portion 61 such that a region on the light incident surface 4a of each of the bandpass filters 4 is in contact with the support surface 61a, the region being located outside the clear aperture 40. Accordingly, the function of each of the bandpass filters 4 is sufficiently exhibited. Therefore, the S/N ratio of an electric signal output from each of the light receiving regions 7a can be improved. Namely, in the spectroscopic module 1, since the support surface 61a is in contact with the region on the light incident surface 4a, the region being located outside the clear aperture 40, the effective opening area of each of the bandpass filters 4 can be utilized to the maximum.

In addition, in the spectroscopic module 1, the light shielding member 8 is disposed between the plurality of bandpass filters 4 and the light detector 7, and the plurality of optical paths from the plurality of bandpass filters 4 to the plurality of light receiving regions 7a are separated from each other by the light shielding member 8. Accordingly, it is possible to suppress occurrence of optical crosstalk between the light receiving regions 7a adjacent to each other.

In addition, in the spectroscopic module 1, the plurality of bandpass filters 4 are held between the support portion 61 and the light shielding member 8. Accordingly, each of the bandpass filters 4 can be reliably held without using, for example, adhesive agent or the like. In addition, since a gap between each of the bandpass filters 4 and the light shielding member 8 is small, it is possible to reliably suppress occurrence of optical crosstalk between the light receiving regions 7a adjacent to each other.

In addition, in the spectroscopic module 1, the light shielding member 8 is made of an elastic material. Accordingly, the light shielding member 8 can be in contact with each of the bandpass filters 4 while each of the bandpass filters 4 is suppressed from being damaged. Therefore, it is possible to reliably suppress occurrence of optical crosstalk between the light receiving regions 7a adjacent to each other.

In addition, in the spectroscopic module 1, the recessed portion 63 which is open to the one side in the Z direction is formed in the second support body 6, the distance between the support surface 61a and the bottom surface 63a of the recessed portion 63 in the Z direction is smaller than the thickness of each of the bandpass filters 4, the light detector 7 is attached to the second support body 6 so as to close the opening of the recessed portion 63, and the light shielding member 8 is disposed in the recessed portion 63 in a state where the light shielding member 8 is compressed. Accordingly, each of the bandpass filters 4 can be more reliably held. In addition, since the light shielding member 8 can be reliably in contact with each of the bandpass filters 4 and the light detector 7, it is possible to more reliably suppress occurrence of optical crosstalk between the light receiving regions 7a adjacent to each other. Particularly, since each of the bandpass filters 4 is interposed between the second support body 6 made of a relatively hard metal and the light shielding member 8 made of an elastic material, each of the bandpass filters 4 can be stably held while each of the bandpass filters 4 is suppressed from being damaged.

In addition, in the spectroscopic module 1, the plurality of positioning holes 8b are formed in the light shielding member 8, and are provided in the second support body 6, each of the plurality of positioning pins 6a fitted into each of the plurality of positioning holes 8b. Accordingly, with a simple structure, the light shielding member 8 can be positioned with respect to the second support body 6, so that the light passage openings 8a of the light shielding member 8 can be positioned with respect to the bandpass filters 4, respectively.

In addition, in the spectroscopic module 1, the light shielding member 8 is formed such that a region on the light outgoing surface 4b of each of the bandpass filters 4 is in contact with the light shielding member 8, the region being located outside the clear aperture 40. Accordingly, the function of each of the bandpass filters 4 is sufficiently exhibited. Therefore, the S/N ratio of an electric signal output from each of the light receiving regions 7a can be improved. In addition, in the spectroscopic module 1, since the light shielding member 8 is in contact with the region on the light outgoing surface 4b, the region being located outside the clear aperture 40, the effective opening area of each of the bandpass filters 4 can be utilized to the maximum.

In addition, in the spectroscopic module 1, the plurality of bandpass filters 4 are separated from each other with a space interposed therebetween, and the light shielding film 43 is provided on the side surface 41b of the light transmitting substrate 41 in each of the bandpass filters 4. Accordingly, for example, even when a wall portion or the like is not provided between the bandpass filters 4 adjacent to each other, stray light can be suppressed from being incident from the side surface 41b of the light transmitting substrate 41 in each of the bandpass filters 4. Further, since stray light is suppressed from being incident from the side surface 41b of the light transmitting substrate 41, the stray light can be suppressed from entering a light detector 7 side from each of the bandpass filters 4. In addition, since the plurality of bandpass filters 4 are separated from each other with a space interposed therebetween, the bandpass filters 4 adjacent to each other in the X direction can be brought close to each other to shorten the optical path length, and as a result, a loss in amount of light can be reduced. For this reason, the amplification factor of an electric signal in a circuit of the wiring substrate 71 can be suppressed, and the S/N ratio can be further improved. Further, since the length in the X direction of the casing 2 can be reduced, the size of the spectroscopic module 1 can be reduced.

In addition, in the spectroscopic module 1, the interference film 42 is provided on the light incident surface 41a of the light transmitting substrate 41 in each of the bandpass filters 4. Accordingly, the generation of stray light by diffused reflection in the light transmitting substrate 41 of each of the bandpass filters 4 can be suppressed. Further, stray light can be suppressed from entering the light detector 7 side from each of the bandpass filters 4.

In addition, in the spectroscopic module 1, the plurality of light detection elements 72 are mounted on the surface 71a of the wiring substrate 71 to form the light detector 7. In a PD array or the like in which the plurality of light receiving regions 7a are formed on one semiconductor substrate, electrical crosstalk may occur in the one semiconductor substrate, which is a problem; however, since the plurality of light detection elements 72 which are electrically independent of each other are used, an insulation can be provided between the light receiving regions 7a adjacent to each other, so that such the situation can be reliably prevented.

In addition, in the spectroscopic module 1, the light shielding member 8 disposed between the plurality of bandpass filters 4 and the light detector 7 includes the plurality of wall portions 81 that are arranged along the X direction with the light passage opening 8a interposed therebetween, and the first wall portion 81a and the second wall portion 81b adjacent to each other among the plurality of wall portions 81 are in contact with the bandpass filter 4 corresponding to the light passage opening 8a between the first wall portion 81a and the second wall portion 81b. Accordingly, it is possible to suppress occurrence of the crosstalk of light between the light receiving regions 7a adjacent to each other. In addition, the width of the light passage opening 8a in the Y direction (third direction) orthogonal to (intersecting) both the X direction in which the plurality of beam splitters 3 and the plurality of bandpass filters 4 are arranged and the Z direction in which the plurality of bandpass filters 4 and the plurality of light receiving regions 7a face each other is larger than the width in the Y direction of the bandpass filter 4. Accordingly, even when the first wall portion 81a and the second wall portion 81b are lowered in order to avoid a decrease in S/N ratio which is caused by lengthening of the optical path from the bandpass filter 4 to the light receiving region 7a, since the width in the Y direction of the light passage opening 8a is large, for example, even if outgas is generated from the adhesive agent S12 or the like used to fix each of the light detection elements 72 to the wiring substrate 71, an increase in concentration of the outgas in the light passage opening 8a can be suppressed. As a result, according to the spectroscopic module 1, a deterioration of the plurality of light receiving regions 7a can be suppressed while the S/N ratio is improved. In addition, according to the spectroscopic module 1, since the width in the Y direction of each of the bandpass filters 4 is short, the size of each of the bandpass filters 4 can be reduced.

The suppression of an increase in concentration of outgas generated in the light passage opening 8a will be further described. For example, when the width in the X direction of the light passage opening 8a is increased in order to suppress an increase in concentration of the outgas, the optical path along the X direction (specifically, the optical path along the direction in which the plurality of beam splitters 3 are arranged) is lengthened. As a result, the S/N ratio decreases. In contrast, according to the spectroscopic module 1, an increase in concentration of the outgas in the light passage opening 8a can be suppressed while avoiding an increase in the length of the optical path along the X direction and the optical path along the Z direction. In addition, for example, when a ventilation hole is formed in the wiring substrate 71 in order to release the outgas to the outside, there is a risk that erroneous detection of light occurs due to backlight entering the light passage opening 8a through the ventilation hole. In addition, when the ventilation hole is formed, there is a risk that the light detection accuracy decreases due to particles entering from the ventilation hole and then adhering to the light receiving region 7a. According to the spectroscopic module 1, an increase in concentration of the outgas can be suppressed while such risks are avoided.

In addition, in the spectroscopic module 1, the width in the Y direction of the light passage opening 8a is larger than the width in the X direction of the light passage opening 8a. Accordingly, even when the width in the X direction of the light passage opening 8a is narrowed in order to avoid a decrease in S/N ratio which is caused by lengthening of the optical path along the X direction, the light passage opening 8a can be widened.

In addition, in the spectroscopic module 1, the light detector 7 includes the wiring substrate 71 and the plurality of light detection elements 72, each of the plurality of light detection elements 72 includes each of the plurality of light receiving regions 7a, and the plurality of light detection elements 72 are fixed to the wiring substrate 71 with the adhesive agent S12. Accordingly, each of the plurality of light detection elements 72 can be easily and reliably fixed to the wiring substrate 71. In addition, even when outgas is generated from the adhesive agent S12, since an increase in concentration of the outgas is suppressed, a deterioration of the light receiving region 7a can be suppressed.

In addition, in the spectroscopic module 1, each of the plurality of light detection elements 72 is located inside the light passage opening 8a. Accordingly, the optical paths from the plurality of bandpass filters 4 to the plurality of light detection elements 72 can be shortened while the occurrence of optical crosstalk between the light receiving regions 7a adjacent to each other is prevented by separation of the plurality of light receiving regions 7a from each other. Therefore, the S/N ratio can be improved. In addition, even when outgas is generated from the adhesive agent S12 or the like in the light passage opening 8a in a state where each of the plurality of light detection elements 72 is surrounded by the light shielding member 8, since the light passage opening 8a is wide, an increase in concentration of the outgas in the light passage opening 8a can be suppressed.

The effect of suppressing a deterioration of the plurality of light receiving regions 7a is particularly effective in a configuration where each of the plurality of light detection elements 72 (discrete semiconductor elements) is located inside the light passage opening 8a as in the present embodiment. Specifically, for example, in a configuration where each of the plurality of discrete semiconductor elements is located inside the light passage opening (namely, when each of the plurality of discrete semiconductor elements is surrounded by the light shielding member), when the light passage opening is not sufficiently wide, there is a concern that when outgas is generated from the adhesive agent or the like in the light passage opening, the concentration of the outgas is increased. In contrast, according to the spectroscopic module 1, since the light passage opening 8a is wide, a deterioration of the light receiving region 7a can be suppressed while such a risk is avoided.

In addition, in the spectroscopic module 1, the second support body 6 supports the plurality of bandpass filters 4, the separation spaces 65a defined by the second support body 6 and the bandpass filter 4 are formed in the second support body 6, and the separation space 65a communicates with the light passage opening 8a. Accordingly, outgas generated in the light passage opening 8a can be released to the separation space 65a. Therefore, an increase in concentration of the outgas can be even further suppressed.

In addition, in the spectroscopic module 1, each of the plurality of bandpass filters 4 are fixed to the second support body 6 with the adhesive agent S11. Accordingly, each of the plurality of bandpass filters 4 can be easily and reliably fixed to the second support body 6. In addition, even when outgas is generated from the adhesive agent S11, since an increase in concentration of the outgas is suppressed, a deterioration of the light receiving region 7a can be suppressed.

In addition, in the spectroscopic module 1, the plurality of recessed portions 65 which are open to the one side in the Z direction are formed in the second support body 6, each of the plurality of recessed portions 65 accommodates each of the plurality of bandpass filters 4, and the separation space 65a is defined by the inner surface of the recessed portion 65 which accommodates the bandpass filter 4 among the plurality of recessed portions 65, and the side surface 4c of the bandpass filter 4. Accordingly, the separation space 65a communicating with the light passage opening 8a can be easily and reliably secured.

In addition, in the spectroscopic module 1, the separation space 65a is open to the light passage opening 8a. Accordingly, the separation space 65a can reliably communicate with the light passage opening 8a while the structure of the second support body 6 is simplified.

In addition, in the spectroscopic module 1, the plurality of separation spaces 65a are formed in the second support body 6 with respect to each of the bandpass filters 4. Accordingly, an increase in concentration of outgas can be further suppressed.

In addition, in the spectroscopic module 1, the first wall portion 81a and the second wall portion 81b are in contact with a region on the light outgoing surface 4b of the bandpass filter 4, the region being located outside the clear aperture 40. Accordingly, the function of each of the plurality of bandpass filters 4 is sufficiently exhibited, so that the S/N ratio can be improved.

In addition, in the spectroscopic module 1, each of the width in the X direction of the first wall portion 81a and the width in the X direction of the second wall portion 81b is smaller than the width in the X direction of the light passage opening 8a. Accordingly, the size of the light shielding member 8 can be reduced while the optical path along the X direction is shortened. In addition, since the optical path along the X direction is shortened, the attenuation of signal light can be suppressed, and the S/N ratio can be improved.

In addition, in the spectroscopic module 1, the plurality of bandpass filters 4 are separated from each other with a space interposed therebetween. Accordingly, the arrangement pitch of the plurality of bandpass filters 4 is narrowed while the optical path along the X direction is shortened. Therefore, the size of the spectroscopic module 1 can be reduced. In addition, since the optical path along the X direction is shortened, the attenuation of signal light can be suppressed, and the S/N ratio can be improved.

In addition, the spectroscopic module 1 includes the light shielding member 8 that is formed separately from the light detector 7, as a light shielding portion, and the light passage opening 8a is formed in the light shielding member 8, as a light passage space. Accordingly, the light shielding portion (light shielding member 8) including the plurality of wall portions and light passage spaces can be reliably obtained.

Second Embodiment

Figure 8:
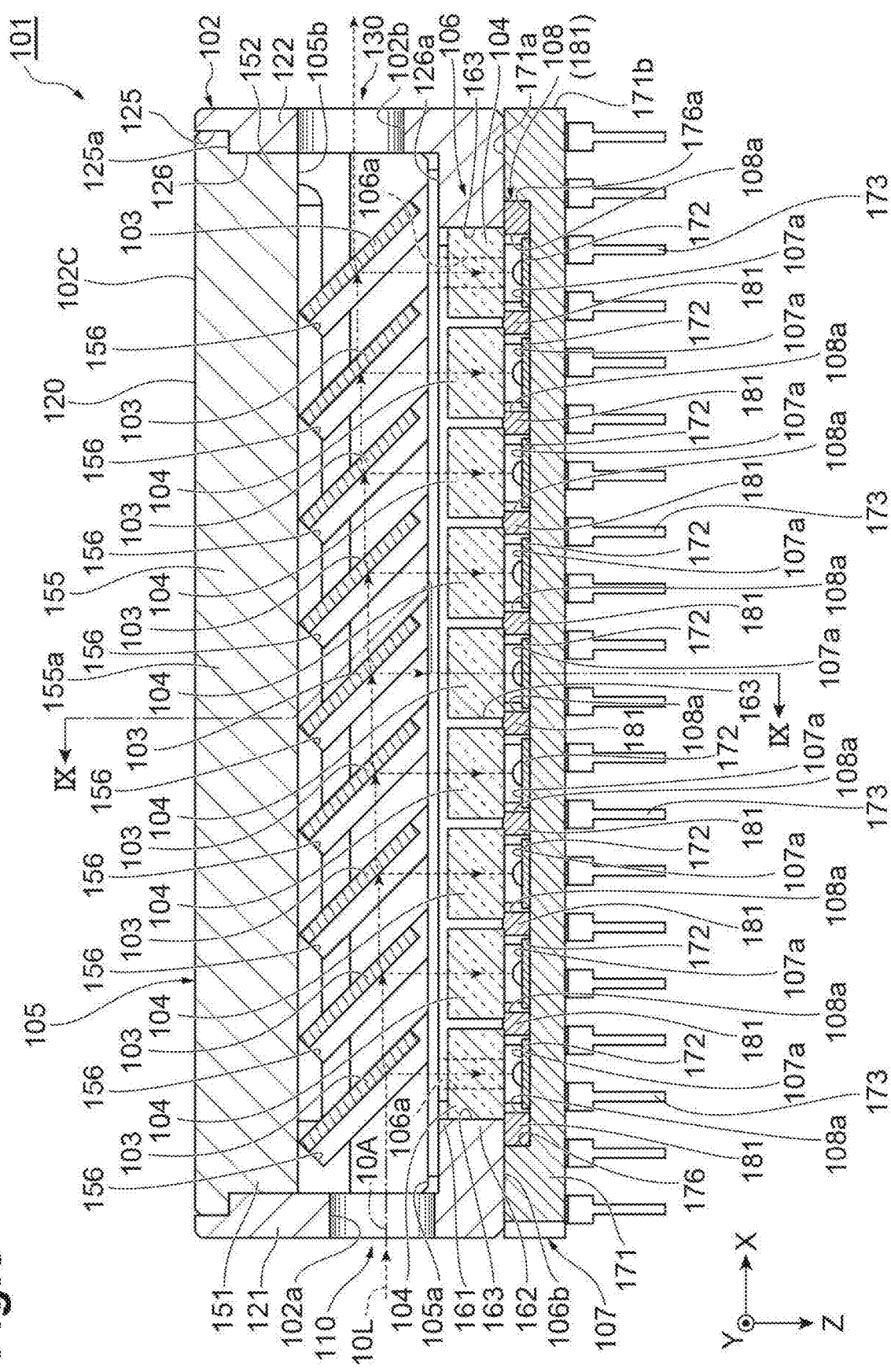
FIG. 8 is a cross-sectional view of a spectroscopic module of a second embodiment.
Figure 9:
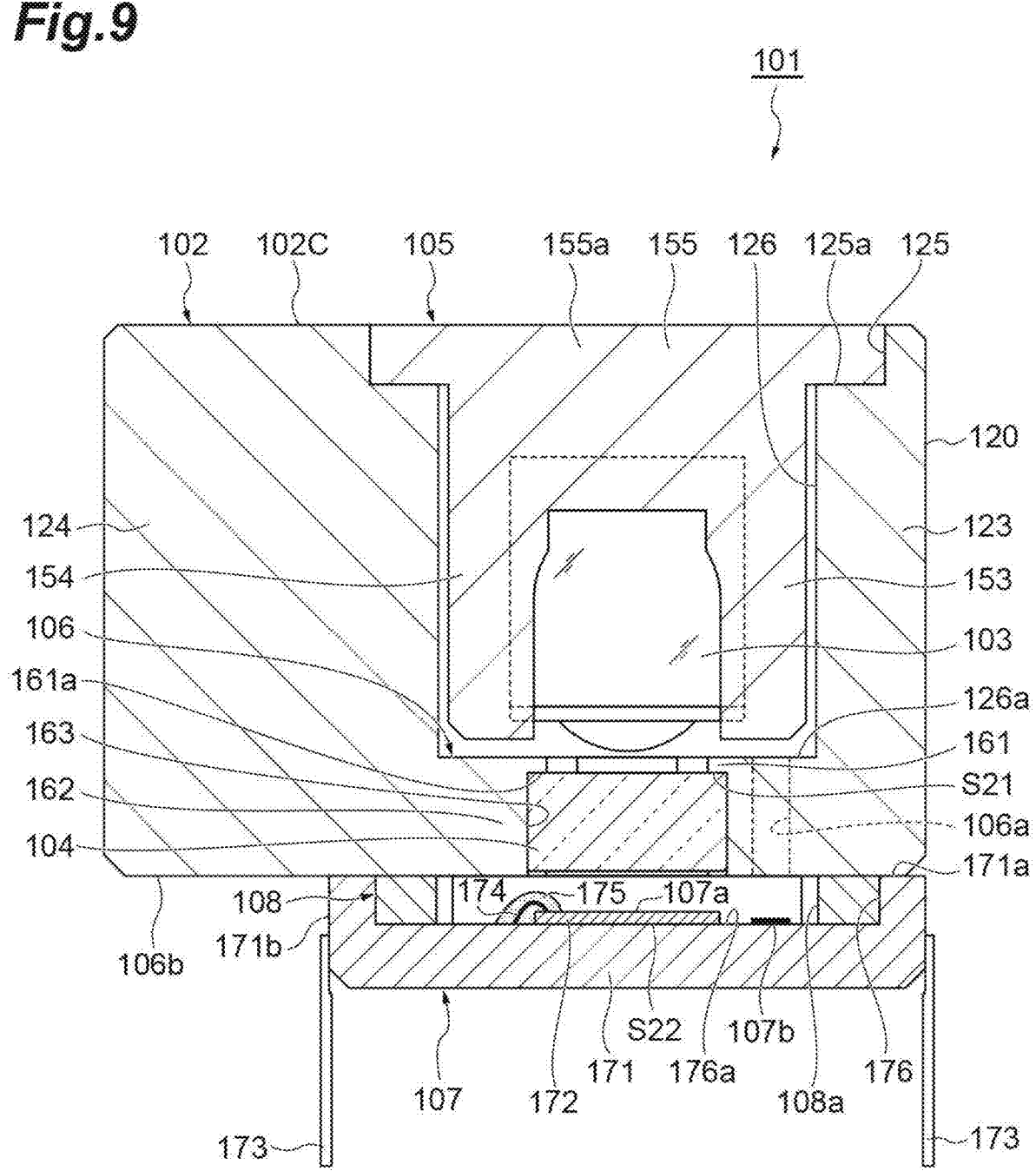
FIG. 9 is a cross-sectional view along line IX-IX illustrated in FIG. 8.

As illustrated in FIGS. 8 and 9, a spectroscopic module 101 is a spectrometer module which includes a casing 102, a plurality of beam splitters 103, a plurality of bandpass filters 104, a first support body 105, a second support body (support body) 106, a light detector 107, and a light shielding member (light shielding portion) 108. The plurality of beam splitters 103 are arranged along the X direction. The plurality of bandpass filters 104 are disposed on the one side in the Z direction. The light detector 107 is disposed on the one side in the Z direction with respect to the plurality of bandpass filters 104. The light detector 107 includes a plurality of light receiving regions 107a.

Each of the beam splitters 103 has the same configuration as that of each of the beam splitters 3 of the first embodiment. Each of the bandpass filters 104 faces each of the beam splitters 103 in the Z direction and transmits light in a predetermined wavelength band in light incident from the beam splitters 103 along the Z direction, to the one side in the Z direction. The bandpass filters 104 each transmit light in different wavelength bands. The plurality of beam splitters 103 and the plurality of bandpass filters 104 are disposed at the same positions as those of the plurality of beam splitters 3 and the plurality of bandpass filters 4 of the first embodiment. Each of the light receiving regions 107a faces each of the bandpass filters 104 in the Z direction, and detects the light incident from the bandpass filters 104 along the Z direction. The light receiving regions 107a form different light detection channels, respectively. Also in the spectroscopic module 101, in the same manner as the spectroscopic module 1 of the first embodiment, measurement light 10L is split into light in a plurality of wavelength bands by the plurality of beam splitters 103 and the plurality of bandpass filters 104, and the light in each of the wavelength bands is detected by the light detector 107.

As illustrated in FIGS. 8 and 9, the casing 102 is a housing which accommodates the plurality of beam splitters 103, the plurality of bandpass filters 104, the first support body 105, and the second support body 106. The casing 102 includes a main body portion 120. The main body portion 120 is formed of a first wall portion 121, a second wall portion 122, a third wall portion 123, and a fourth wall portion 124. The first wall portion 121 and the second wall portion 122 face each other in the X direction. The second wall portion 122 is located on the one side in the X direction with respect to the first wall portion 121. The third wall portion 123 is located on the one side in the Y direction (third direction) with respect to the first wall portion 121 and the second wall portion 122. The fourth wall portion 124 is located on the other side in the Y direction with respect to the third wall portion 123.

A light incident hole 102a through which the measurement light 10L is incident into the casing 102 along the X direction is formed in the first wall portion 121. A light outgoing hole 102b through which the measurement light 10L is output from the casing 102 along the X direction is formed in the second wall portion 122. An optical axis 10B of the light outgoing hole 102b is located on the other side in the Z direction from an optical axis 10A of the light incident hole 102a. The third wall portion 123 and the fourth wall portion 124 are integrally formed with the second support body 106.

The main body portion 120 has a surface 102c on the other side in the Z direction. As illustrated in FIGS. 8 and 9, a first recessed portion 125 which is open to the other side in the Z direction is formed in the surface 102c. The first recessed portion 125 is formed by inner surfaces of the first wall portion 121, the second wall portion 122, the third wall portion 123, and the fourth wall portion 124 of the main body portion 120. A second recessed portion 126 which is open to the other side in the Z direction is formed in a bottom surface 125a of the first recessed portion 125. In the present embodiment, the second recessed portion 126 is formed by the inner surfaces of the first wall portion 121, the second wall portion 122, the third wall portion 123, and the fourth wall portion 124, and a surface on the other side in the Z direction of the second support body 106. In addition, the bottom surface 125a is provided with a plurality of positioning pins (not illustrated). The main body portion 120 and the second support body 106 are integrally formed from, for example, metal.

As illustrated in FIGS. 8 and 9, the first support body 105 supports the plurality of beam splitters 103. The first support body 105 is formed of a first wall portion 151, a second wall portion 152, a third wall portion 153, a fourth wall portion 154, and a fifth wall portion 155. The first wall portion 151 and the second wall portion 152 face each other in the X direction. The second wall portion 152 is located on the one side in the X direction with respect to the first wall portion 151. The third wall portion 153 and the fourth wall portion 154 face each other in the Y direction. The third wall portion 153 is located on the one side in the Y direction with respect to the first wall portion 151 and the second wall portion 152. The fourth wall portion 154 is located on the other side in the Y direction with respect to the first wall portion 151 and the second wall portion 152. The fifth wall portion 155 is located on the other side in the Z direction with respect to the first wall portion 151, the second wall portion 152, the third wall portion 153, and the fourth wall portion 154. The first support body 105 is integrally formed from, for example, metal.

A light incident opening 105a through which the measurement light 10L is incident on the plurality of beam splitters 103 along the X direction is formed in the first wall portion 151. A light outgoing opening 105b through which the measurement light 10L is output from the plurality of beam splitters 103 along the X direction is formed in the second wall portion 152. The light incident opening 105a and the light outgoing opening 105b are open to the one side in the Z direction.

The fifth wall portion 155 forms a cover portion 155a. A plurality of positioning holes (not illustrated) are formed in the cover portion 155a. The cover portion 155a is attached to the main body portion 120 so as to close an opening of the first recessed portion 125. The cover portion 155a has the same shape as that of the first recessed portion 125 when seen in the Z direction, and is formed to be able to be in close contact with the first recessed portion 125. The first wall portion 151, the second wall portion 152, the third wall portion 153, and the fourth wall portion 154 are disposed in the second recessed portion 126. The first support body 105 is attached to the casing 102 in a state where each of the positioning pins of the bottom surface 125a are fitted into each of the positioning holes of the cover portion 155a, to define the position of the first support body 105 in a plane (along the plane) parallel to both the X direction and the Y direction, and in a state where the first support body 105 is accommodated in the first recessed portion 125 and the second recessed portion 126. The first support body 105 is fixed to the casing 102 with, for example, screws or the like.

Figure 10:
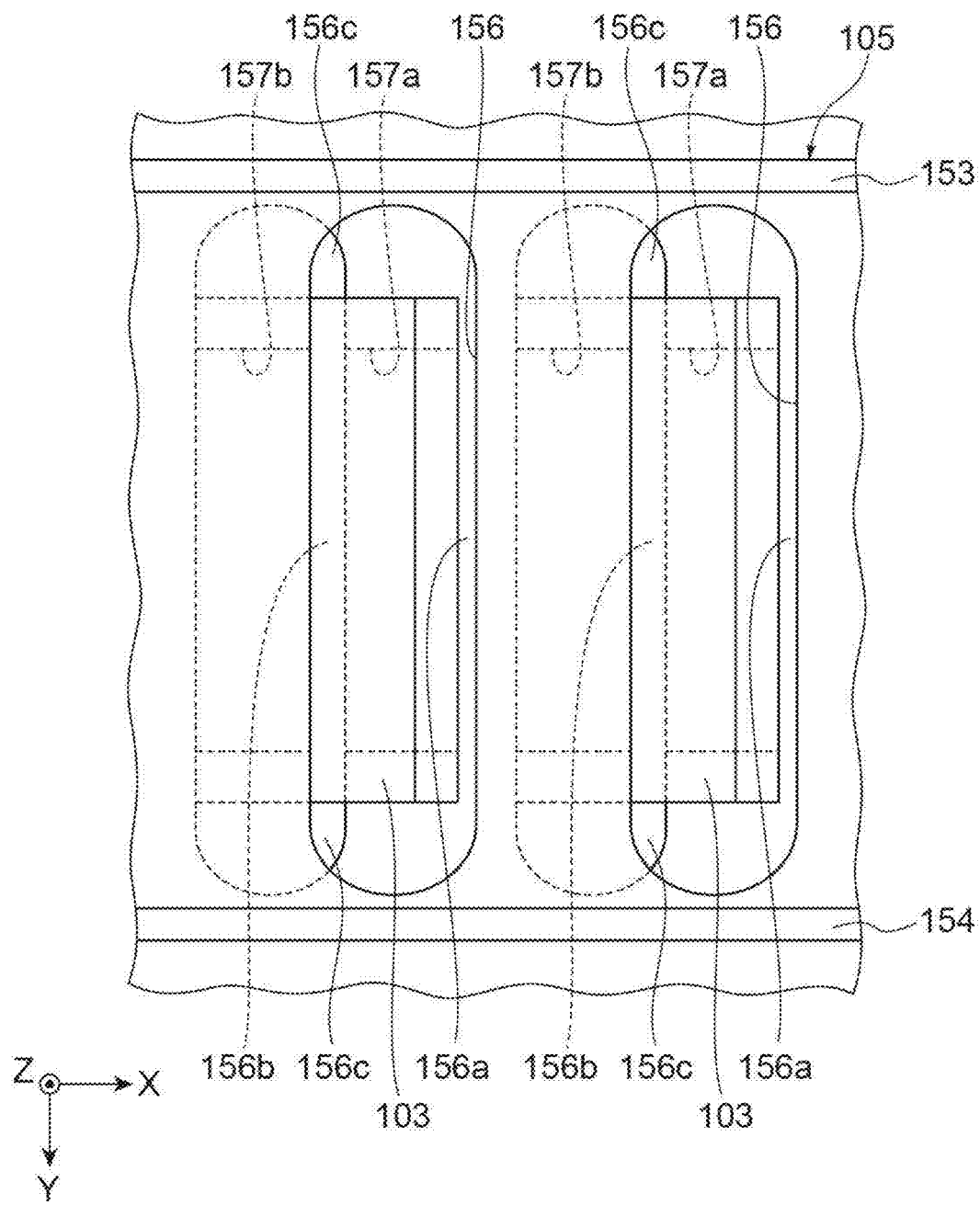
FIG. 10 is a plan view of a portion of a first support body illustrated in FIG. 8.

A plurality of grooves 156 are formed in the first support body 105. As illustrated in FIGS. 8 and 10, each of the grooves 156 is open to an outer surface on an opposite side in the Z direction from the fifth wall portion 155 (on the one side in the Z direction), and differs from the groove 56 of the first embodiment in that a depth direction of each of the grooves 156 is a direction which is inclined by 45° such that the deeper the groove 156 is, the closer to the other side in the X direction the groove 156 is located, among directions perpendicular to the Y direction. An extending direction of each of the grooves 156 is a direction parallel to the Y direction. Each of the grooves 156 has a pair of side surfaces 156a and 156b and a bottom surface 156c. The pair of side surfaces 156a and 156b face each other in a width direction (direction perpendicular to both the extending direction and the depth direction) of each of the grooves 156. A light passage opening 157a is formed in the side surface 156a and a light passage opening 157b is formed in the side surface 156b. The bottom surface 156c is located on the other side in the Z direction with respect to the pair of side surfaces 156a and 156b.

In the present embodiment, each of the grooves 156 is formed such that both end portions in the extending direction of the groove 156 are located in the third wall portion 153 and the fourth wall portion 154, respectively. The side surface 156a is cut out by a space between the third wall portion 153 and the fourth wall portion 154 facing each other in the Y direction, so that the light passage opening 157a is formed in the side surface 156a. The side surface 156b is cut out by the space, so that the light passage opening 157b is formed in the side surface 156b. In addition, the bottom surface 156c is separated into two regions in the Y direction.

In the corresponding groove 156 and beam splitter 103, the groove 156 has a width (namely, a distance between the pair of side surfaces 156a and 156b) twice or more the thickness of the beam splitter 103. In the corresponding groove 156 and beam splitter 103, the beam splitter 103 is disposed in the groove 156 to be in contact with the side surface 156a and the bottom surface 156c, the side surface 156a being located on the other side of the pair of side surfaces 156a and 156b in the Z direction. In this state, the beam splitter 103 is fixed to the side surface 156a and the bottom surface 156c with, for example, adhesive agent.

As illustrated in FIG. 8, in the spectroscopic module 101, a light incident portion 110 is formed of the light incident hole 102a and the light incident opening 105a. The light incident portion 110 defines light to be incident on the plurality of beam splitters 103 along the X direction. A positional relationship between the plurality of beam splitters 103 and the optical axis 10A of the light incident portion 110 is the same as the relationship between the plurality of beam splitters 3 and the optical axis A of the light incident portion 10 of the first embodiment. Namely, also in the spectroscopic module 101, the plurality of beam splitters 103 are disposed with respect to the optical axis 10A of the light incident portion 110 such that the distance in the Z direction between the optical axis 10A and a line which passes through the center of each of the beam splitters 103 and is parallel to the X direction is $\Delta Z(M-1)/2$. In addition, in the spectroscopic module 101, a light outgoing portion 130 is formed of the light outgoing hole 102b and the light outgoing opening 105b. The light outgoing portion 130 defines light to be output from the plurality of beam splitters 103 along the X direction.

Figure 11:
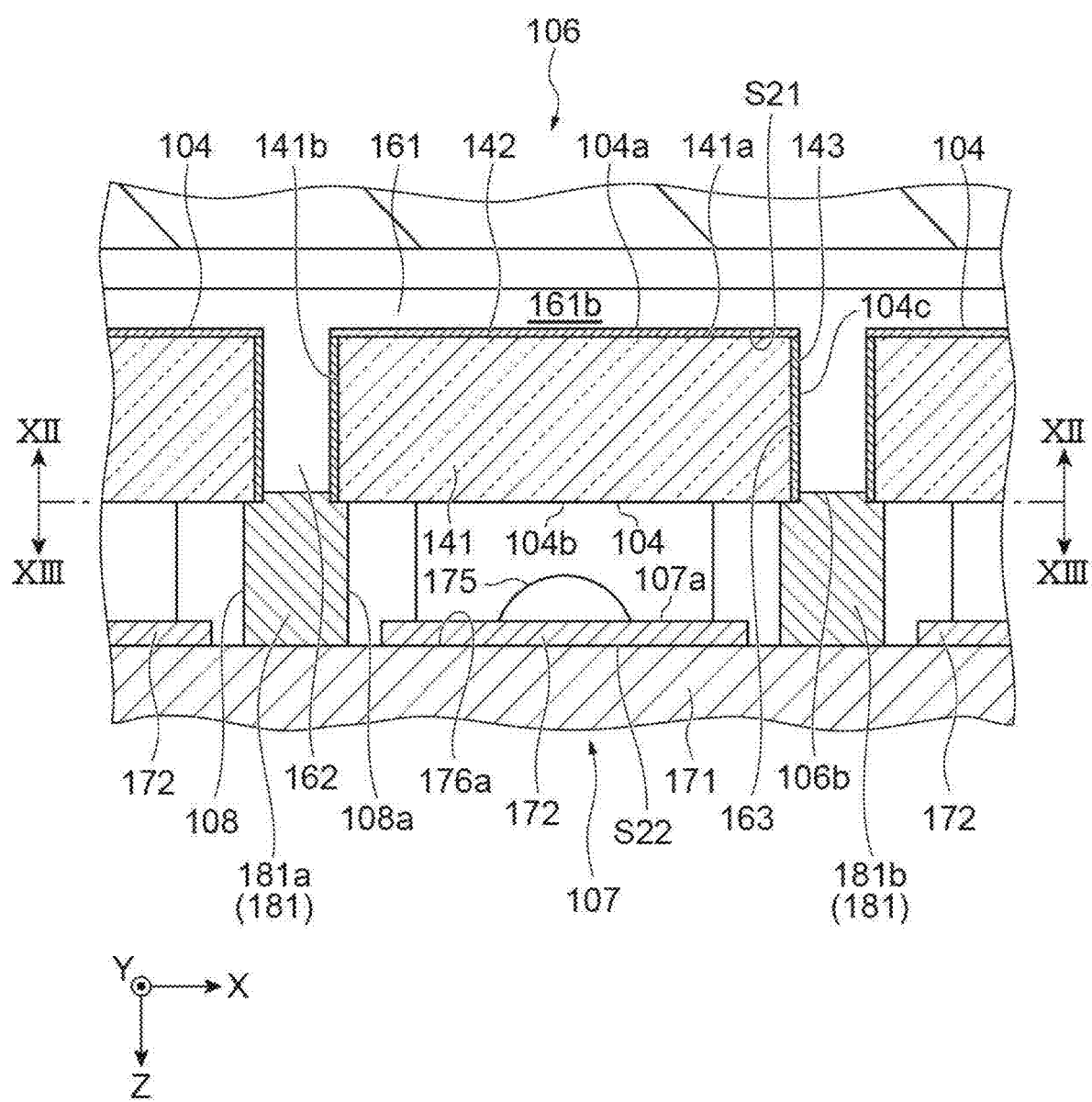
FIG. 11 is a cross-sectional view of a portion of a second support body illustrated in FIG. 8.
Figure 12:
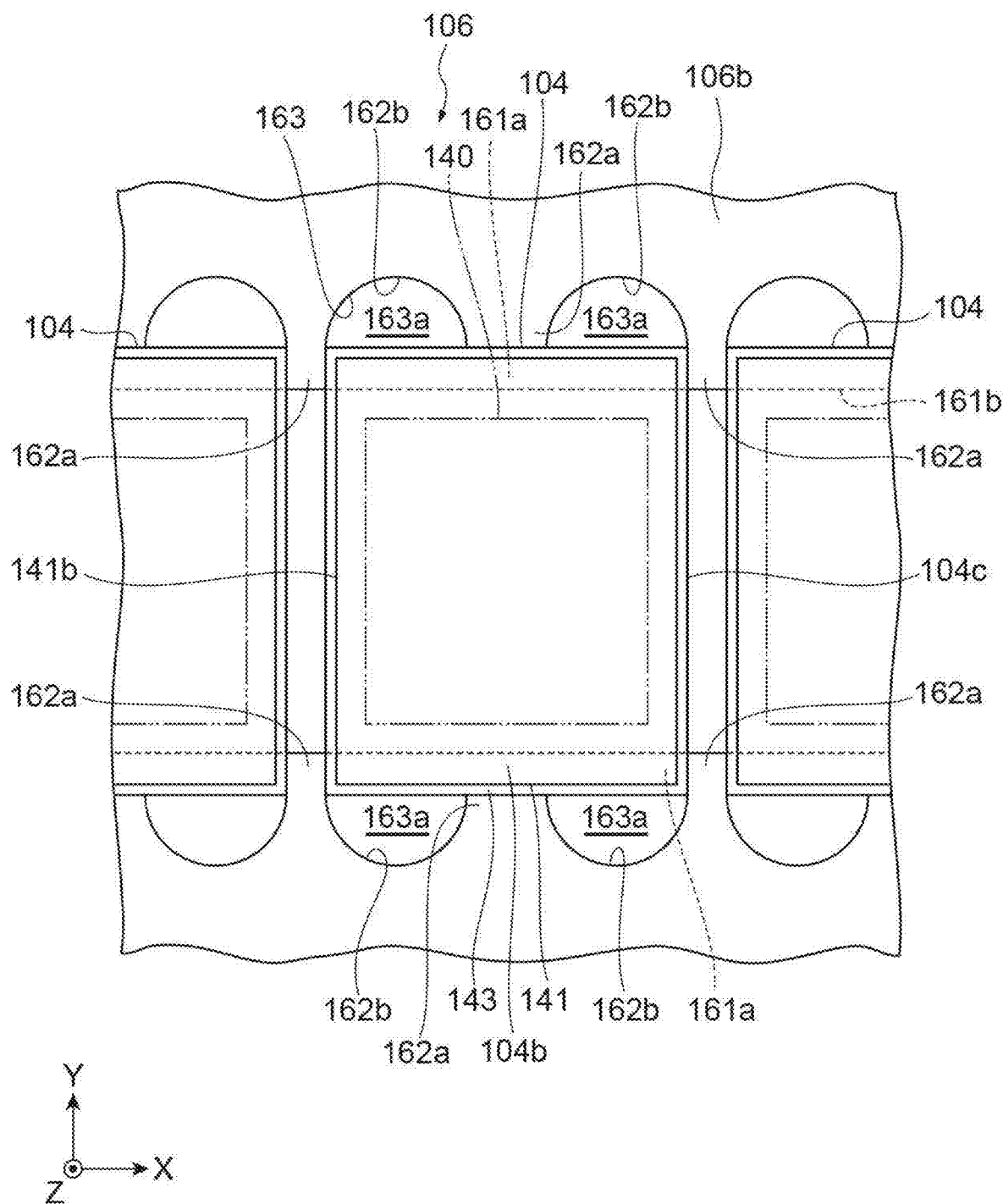
FIG. 12 is a cross-sectional view along line XII-XII illustrated in FIG. 11.

As illustrated in FIGS. 11 and 12, the second support body 106 supports the plurality of bandpass filters 104. Each of the bandpass filters 104 includes a light transmitting substrate 141, an interference film 142, and a light shielding film 143. The light transmitting substrate 141 has, for example, a rectangular plate shape having the Y direction as a longitudinal direction. The interference film 142 is provided on a light incident surface 141a of the light transmitting substrate 141. The interference film 142 is, for example, a dielectric multilayer film. The light shielding film 143 is provided on a side surface 141b of the light transmitting substrate 141. The light shielding film 143 is, for example, a black paint film. In each of the bandpass filters 104, a surface on an opposite side of the interference film 142 from the light transmitting substrate 141 is a light incident surface 104a of the bandpass filter 104, a surface on an opposite side of the light transmitting substrate 141 from the interference film 142 is a light outgoing surface 104b of the bandpass filter 104, and an outer surface of the light shielding film 143 is a side surface 104c of the bandpass filter 104. Incidentally, in FIGS. 1 and 2, each of the bandpass filters 104 is illustrated in a state where the configuration is simplified.

The second support body 106 includes a support portion 161. A support surface 161a is formed in the support portion 161 so as to be open to the one side in the Z direction. The plurality of bandpass filters 104 are disposed on the support surface 161a to be arranged along the X direction. Each of the bandpass filters 104 is fixed to the support surface 161a (second support body 106) with adhesive agent S21. The support surface 161a is a surface perpendicular to the Z direction, and is formed in the support portion 161 such that a region on the light incident surface 104a of each of the bandpass filters 104 is in contact with the support surface 161a, the region being located outside a clear aperture 140. The clear aperture 140 is an effective opening region in which the function of the bandpass filter 104 is guaranteed. One light passage opening 161b through which a plurality of optical paths (dotted line illustrated in FIG. 8) from the plurality of beam splitters 103 to the plurality of bandpass filters 104 pass is formed in the support portion 161. Accordingly, the support surface 161a is separated into two regions in the Y direction.

The second support body 106 further includes a restriction portion 162. The restriction portion 162 is provided in the second support body 106 to be located on the one side in the Z direction with respect to the support portion 161. The restriction portion 162 restricts each of the bandpass filters 104 from moving in a direction perpendicular to the Z direction. The restriction portion 162 is formed of a plurality of contact portions 162a that are provided so as to be in contact with the side surface 104c of each of the bandpass filters 104, and a plurality of separation portions 162b that are provided so as to be separated from the side surface 104c of each of the bandpass filters 104. The restriction portion 162 does not completely partition the plurality of bandpass filters 104 off from each other. Namely, the plurality of bandpass filters 104 are separated from each other with a space interposed therebetween in a state where the movement thereof in the direction perpendicular to the Z direction is restricted by the restriction portion 162.

A plurality of recessed portions 163 which are open to the one side in the Z direction are formed in a surface 106b on the one side in the Z direction of the second support body 106. A side surface of each of the recessed portions 163 is an inner surface of the restriction portion 162, and a bottom surface of each of the recessed portions 163 is the support surface 161a of the support portion 161. Each of the recessed portions 163 accommodates one bandpass filter 104. The distance between the support surface 161a and the surface 106b in the Z direction is smaller than the thickness of each of the bandpass filters 104 (namely, a distance between the light incident surface 104a and the light outgoing surface 104b in the Z direction). Accordingly, a portion on an opposite side of each of the bandpass filters 104 from the support portion 161 protrudes from the surface 106b, and the light outgoing surface 104b of each of the bandpass filters 104 is located on the one side in the Z direction from the surface 106b (refer to FIG. 11).

As illustrated in FIG. 12, a plurality of separation spaces 163a are formed in the second support body 106 with respect to each of the bandpass filters 104. Each of the separation spaces 163a is defined by the second support body 106 and the bandpass filter 104. Specifically, each of the separation spaces 163a is defined by an inner surface of the recessed portion 163 and the side surface 104c of the bandpass filters 104. In the present embodiment, each of the separation spaces 163a is defined by an inner surface of the separation portion 162b in the side surface of the recessed portion 163, an exposed surface in the bottom surface of the recessed portion 163 when seen from the one side in the Z direction, and the side surface 104c of the bandpass filter 4.

As illustrated in FIGS. 8 and 9, the light detector 107 includes a wiring substrate 171, a plurality of light detection elements 172, and a plurality of terminals 173. A recessed portion 176 which is open to the other side in the Z direction is formed in a surface 171a on a plurality of bandpass filters 104 side of the wiring substrate 171. The plurality of light detection elements 172 are mounted on a bottom surface 176a of the recessed portion 176 to be arranged along the X direction. Namely, in the present embodiment, the plurality of light detection elements 172 are located in the recessed portion 176. Each of the light detection elements 172 is fixed to the wiring substrate 171 with adhesive agent S22. Each of the light detection elements 172 is a discrete semiconductor element such as a PD chip, and has the light receiving region 107a. The plurality of terminals 173 are attached to a side surface 171b of the wiring substrate 171. Each of the terminals 173 is a terminal through an electric signal or the like is input to and output from each of the light detection elements 172. The plurality of terminals 173 extend to the one side in the Z direction. The light detector 107 is attached to the second support body 106 such that the restriction portion 162 and the recessed portion 176 face each other.

The light shielding member 108 is disposed between the plurality of bandpass filters 104 and the light detector 107. The light shielding member 108 is made of an elastic material, and is disposed in the recessed portion 176 of the light detector 107 in a state where the light shielding member 108 is compressed. In this state, the plurality of bandpass filters 104 are held between the support portion 161 of the second support body 106 and the light shielding member 108. A surface on the plurality of bandpass filters 104 side of the light shielding member 108 is in contact with the light outgoing surface 104b of each of the bandpass filters 104. A surface on a light detector 107 side of the light shielding member 108 is in contact with the bottom surface 176a of the recessed portion 176 of the wiring substrate 171.

Figure 13:
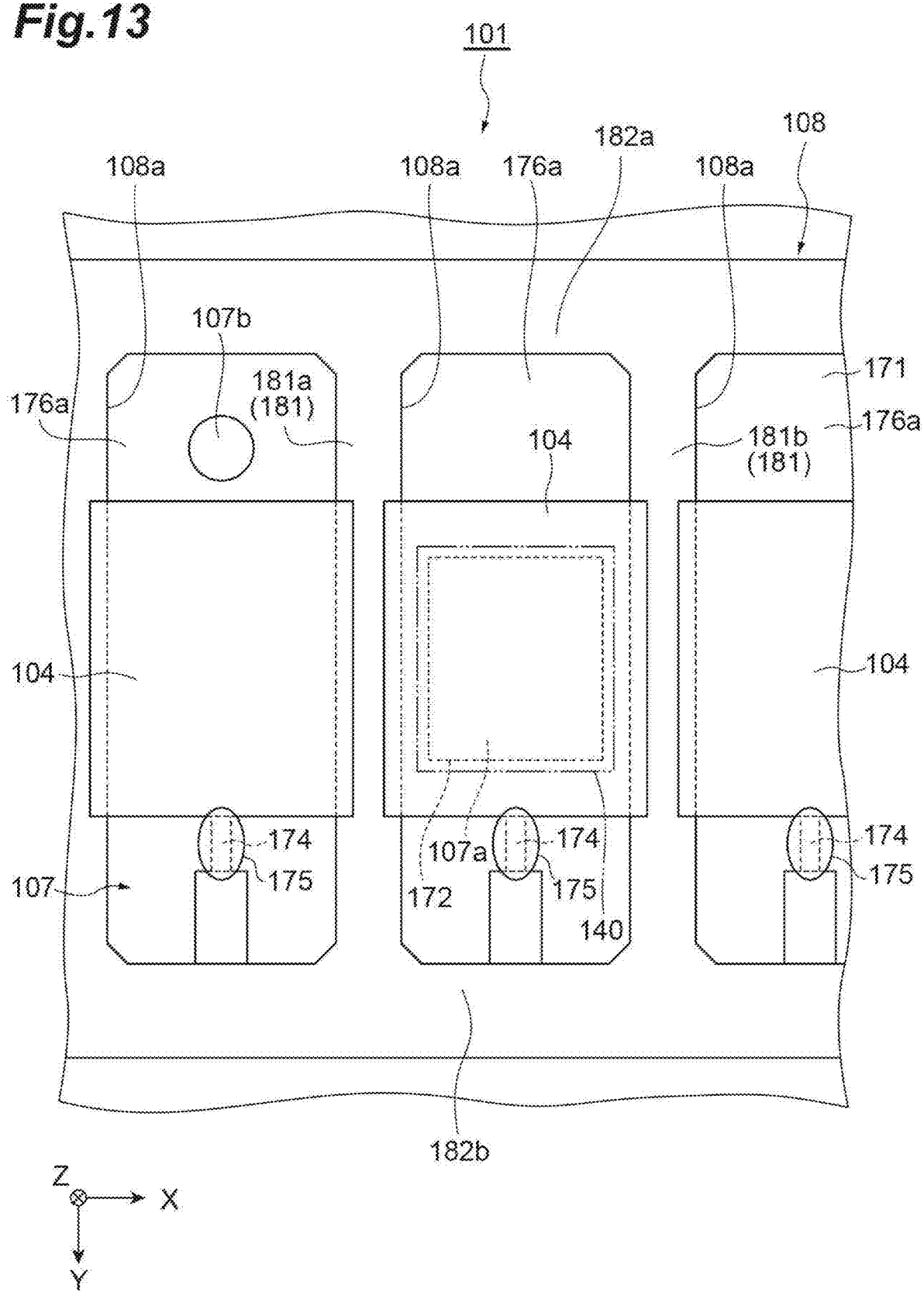
FIG. 13 is a cross-sectional view along line XIII-XIII illustrated in FIG. 11.

A plurality of light passage openings (light passage spaces) 108a are formed in the light shielding member 108. The light shielding member 108 includes a plurality of wall portions 181. As illustrated in FIGS. 8 and 13, the wall portions 181 are arranged along the X direction with the light passage opening 108a interposed therebetween. Namely, each of the plurality of wall portions 181 is arranged between the light passage openings 108a adjacent to each other. Each of a plurality of optical paths from the plurality of bandpass filters 104 to the plurality of light receiving regions 107a passes through each of the plurality of light passage openings 108a. Namely, the plurality of optical paths from the plurality of bandpass filters 104 to the plurality of light receiving regions 107a are separated from each other by the light shielding member 108. In the present embodiment, each of the light detection elements 172 of the light detector 107 is located inside each of the light passage openings 108a of the light shielding member 108. In each of the light passage openings 108a, a terminal of the light detection element 172 (not illustrated) and the terminal 173 of the wiring substrate 171 are electrically connected by a wire 174, and the wire 174 is covered with a resin member 175. As illustrated in FIG. 11, each of the light passage openings 108a is formed between the light outgoing surface 104b and the light receiving region 107a.

As illustrated in FIGS. 11 and 13, a first wall portion 181a and a second wall portion 181b adjacent to each other among the plurality of wall portions 181 are in contact with the bandpass filter 104 corresponding to the light passage opening 108a between the first wall portion 181a and the second wall portion 181b.

As illustrated in FIG. 13, the width in the Y direction of the light passage opening 108a is larger than the width in the X direction of the light passage opening 108a. Namely, the light passage opening 108a has a long shape having the Y direction as a longitudinal direction. In the present embodiment, the light passage opening 108a has a rectangular shape having the Y direction as a longitudinal direction. The width in the Y direction of the light passage opening 108a is a distance from a portion 182a to a portion 182b in the light shielding member 108, the portion 182a being located on the one side in the Y direction with respect to the first wall portion 181a and the second wall portion 181b, the portion 182b being located on the other side in the Y direction with respect to the first wall portion 181a and the second wall portion 181b. The width in the X direction of the light passage opening 108a is a distance from the first wall portion 181a to the second wall portion 181b in the X direction in the light shielding member 108. Each of the width in the X direction of the first wall portion 181a and the width in the X direction of the second wall portion 181b is smaller than the width in the X direction of the light passage opening 8a. Incidentally, in the specification, the expression that the width in the Y direction of the light passage opening 108a is larger than the width in the X direction of the light passage opening 108a means that when the light passage opening 108a corresponding to the Y direction and the light passage opening 108a corresponding to the X direction are overlapped in a state where the Y direction and the X direction are aligned with each other, a part of the light passage opening 108a corresponding to the Y direction protrudes in a direction in which the Y direction and the X direction are aligned with each other.

As illustrated in FIG. 13, the width in the Y direction of the light passage opening 108a is larger than the width in the Y direction of the bandpass filter 104. In the present embodiment, when seen in the Z direction, the first wall portion 181a and the second wall portion 181b are in contact with the bandpass filter 104 such that the light passage opening 108a is located on both sides in the Y direction with respect to the bandpass filter 104. Incidentally, in the specification, the expression that the width in the Y direction of the light passage opening 108a is larger than the width in the Y direction of the bandpass filter 104 means that when the light passage opening 108a and the bandpass filter 104 are overlapped in the Y direction, a part of the light passage opening 108a protrudes in the Y direction.

Each of the separation spaces 163a formed in the recessed portion 163 communicates with the light passage opening 108a of the light shielding member 108. Specifically, each of the separation spaces 163a is open to the light passage opening 108a. In other words, at least a part of each of the separation spaces 163a is continuous with a part of the light passage opening 108a, and overlaps a part of the light passage opening 108a when seen in the Z direction. For example, four separation spaces 163a are formed in each of the recessed portions 163, and the four separation spaces 163a are open to one light passage opening 108a. In addition, in the present embodiment, the depth in the Z direction of the recessed portion 163 is larger than the width in the Z direction of the light passage opening 108a. As one example, the thickness of the recessed portion 163 is 2.5 mm or more, and the thickness in the Z direction of the light passage opening 108a (for example, the thickness in the Z direction of the light shielding member 108) is 1.0 mm to 1.2 mm.

As illustrated in FIG. 12, each of the light passage openings 108a is formed in the light shielding member 108 such that a region on the light outgoing surface 104b of each of the bandpass filters 104 is in contact with the light shielding member 108, the region being located outside the clear aperture 140. Namely, the light shielding member 108 is formed such that a region on the light outgoing surface 104b of each of the bandpass filters 104 is in contact with the light shielding member 108, the region being located outside the clear aperture 140. Specifically, as illustrated in FIG. 13, the first wall portion 181a and the second wall portion 181b are in contact with a region on the light outgoing surface 104b of the bandpass filter 104, the region being located outside the clear aperture 140.

As illustrated in FIG. 9, a plurality of positioning holes 106a are formed in the second support body 106. Among the plurality of positioning holes 106a, one is formed on a third wall portion 123 side in the Y direction with respect to the bandpass filters 104 of the foremost stage, and one is on the third wall portion 123 side in the Y direction with respect to the bandpass filters 104 of the rearmost stage. Each of the positioning holes 106a is formed from a bottom surface 126a of the second recessed portion 126 of the casing 102 to a surface on the one side in the Z direction of the second support body 106. A plurality of positioning marks 107b are formed on the bottom surface 176a of the wiring substrate 171. Each of the positioning marks 107b is formed on a side opposite the wire 174 in the Y direction with respect to the light detection element 172 when seen from the other side in the Z direction. Each of the positioning holes 106a overlaps the positioning mark 107b when seen from the other side in the Z direction. Accordingly, when the second support body 106 (namely, the casing 102) and the light detector 107 are assembled, the correct assembly position of the second support body 106 with respect to the light detector 107 can be confirmed.

In the spectroscopic module 101, the light shielding member 108 disposed between the plurality of bandpass filters 104 and the light detector 107 includes the plurality of wall portions 181 that are arranged along the X direction with the light passage opening 108a interposed therebetween, and the first wall portion 181a and the second wall portion 181b adjacent to each other among the plurality of wall portions 181 are in contact with the bandpass filter 104 corresponding to the light passage opening 108a between the first wall portion 181a and the second wall portion 181b. Accordingly, it is possible to suppress occurrence of the crosstalk of light between the light receiving regions 107a adjacent to each other. In addition, the width of the light passage opening 108a in the Y direction (third direction) orthogonal to (intersecting) both the X direction in which the plurality of beam splitters 103 and the plurality of bandpass filters 104 are arranged and the Z direction in which the plurality of bandpass filters 104 and the plurality of light receiving regions 107a face each other is larger than the width in the Y direction of the bandpass filter 104. Accordingly, even when the first wall portion 181a and the second wall portion 181b are lowered in order to avoid a decrease in S/N ratio which is caused by lengthening of the optical path from the bandpass filter 104 to the light receiving region 107a, since the width in the Y direction of the light passage opening 108a is large, for example, even if outgas is generated from the adhesive agent S22 or the like used to fix each of the light detection elements 172 to the wiring substrate 171, an increase in concentration of the outgas in the light passage opening 108a can be suppressed. As a result, according to the spectroscopic module 101, a deterioration of the plurality of light receiving regions 107a can be suppressed while the S/N ratio is improved. In addition, according to the spectroscopic module 101, since the width in the Y direction of each of the bandpass filters 104 is short, the size of each of the bandpass filters 104 can be reduced.

The suppression of an increase in concentration of outgas generated in the light passage opening 108a will be further described. For example, when the width in the X direction of the light passage opening 108a is increased in order to suppress an increase in concentration of the outgas, the optical path along the X direction (specifically, the optical path along the direction in which the plurality of beam splitters 103 are arranged) is lengthened. As a result, the S/N ratio decreases. In contrast, according to the spectroscopic module 101, an increase in concentration of the outgas in the light passage opening 108a can be suppressed while avoiding an increase in the length of the optical path along the X direction and the optical path along the Z direction. In addition, for example, when a ventilation hole is formed in the wiring substrate 171 in order to release the outgas to the outside, there is a risk that erroneous detection of light occurs due to backlight entering the light passage opening 108a through the ventilation hole. In addition, when the ventilation hole is formed, there is a risk that the light detection accuracy decreases due to particles entering from the ventilation hole and then adhering to the light receiving region 107a. According to the spectroscopic module 101, an increase in concentration of the outgas can be suppressed while such risks are avoided.

In addition, in the spectroscopic module 101, the width in the Y direction of the light passage opening 108a is larger than the width in the X direction of the light passage opening 108a. Accordingly, even when the width in the X direction of the light passage opening 108a is narrowed in order to avoid a decrease in S/N ratio which is caused by lengthening of the optical path along the X direction, the light passage opening 108a can be widened.

In addition, in the spectroscopic module 101, the light detector 107 includes the wiring substrate 171 and the plurality of light detection elements 172, each of the plurality of light detection elements 172 includes each of the plurality of light receiving regions 107a, and the plurality of light detection elements 172 are fixed to the wiring substrate 171 with the adhesive agent S22. Accordingly, each of the plurality of light detection elements 172 can be easily and reliably fixed to the wiring substrate 171. In addition, even when outgas is generated from the adhesive agent S22, since an increase in concentration of the outgas is suppressed, a deterioration of the light receiving region 107a can be suppressed.

In addition, in the spectroscopic module 101, each of the plurality of light detection elements 172 is located inside the light passage opening 108a. Accordingly, the optical paths from the plurality of bandpass filters 104 to the plurality of light detection elements 172 can be shortened while the occurrence of optical crosstalk between the light receiving regions 107a adjacent to each other is prevented by separation of the plurality of light receiving regions 107a from each other. Therefore, the S/N ratio can be improved. In addition, even when outgas is generated from the adhesive agent S22 or the like in the light passage opening 108a in a state where each of the plurality of light detection elements 172 is surrounded by the light shielding member 108, since the light passage opening 108a is wide, an increase in concentration of the outgas in the light passage opening 108a can be suppressed.

The effect of suppressing a deterioration of the plurality of light receiving regions 107a is particularly effective in a configuration where each of the plurality of light detection elements 172 (discrete semiconductor elements) is located inside the light passage opening 108a as in the present embodiment. Specifically, for example, in a configuration where each of the plurality of discrete semiconductor elements is located inside the light passage opening (namely, when each of the plurality of discrete semiconductor elements is surrounded by the light shielding member), when the light passage opening is not sufficiently wide, there is a concern that when outgas is generated from the adhesive agent or the like in the light passage opening, the concentration of the outgas is increased. In contrast, according to the spectroscopic module 101, since the light passage opening 108a is wide, a deterioration of the light receiving region 107a can be suppressed while such a risk is avoided.

In addition, in the spectroscopic module 101, the second support body 106 supports the plurality of bandpass filters 104, the separation spaces 163a defined by the second support body 106 and the bandpass filter 104 are formed in the second support body 106, and the separation spaces 163a communicate with the light passage opening 108a. Accordingly, outgas generated in the light passage opening 108a can be released to the separation spaces 163a. Therefore, an increase in concentration of the outgas can be even further suppressed.

In addition, in the spectroscopic module 101, each of the plurality of bandpass filters 104 are fixed to the second support body 106 with the adhesive agent S21. Accordingly, each of the plurality of bandpass filters 104 can be easily and reliably fixed to the second support body 106. In addition, even when outgas is generated from the adhesive agent S21, since an increase in concentration of the outgas is suppressed, a deterioration of the light receiving region 107a can be suppressed.

In addition, in the spectroscopic module 101, the plurality of recessed portions 163 which are open to the one side in the Z direction are formed in the second support body 106, each of the plurality of recessed portions 163 accommodates each of the plurality of bandpass filters 104, and the separation space 163a is defined by the inner surface of the recessed portion 163 which accommodates the bandpass filter 104 among the plurality of recessed portions 163, and the side surface 104c of the bandpass filters 104. Accordingly, the separation spaces 163a communicating with the light passage opening 108a can be easily and reliably secured.

In addition, in the spectroscopic module 101, the separation spaces 163a are open to the light passage opening 108a. Accordingly, the separation spaces 163a can reliably communicate with the light passage opening 108a while the structure of the second support body 106 is simplified.

In addition, in the spectroscopic module 101, the plurality of separation spaces 163a are formed in the second support body 106 with respect to each of the bandpass filters 104. Accordingly, an increase in concentration of outgas can be further suppressed.

In addition, in the spectroscopic module 101, the depth in the Z direction of the recessed portion 163 is larger than the width in the Z direction of the light passage opening 108a. Accordingly, the separation spaces 163a can be widened while the plurality of optical paths from the plurality of bandpass filters 104 to the plurality of light receiving regions 107a are shortened.

Particularly, in the spectroscopic module 101, the bandpass filters 104 includes the light shielding film 143 provided on the side surface 141b of the light transmitting substrate 141. Accordingly, even when the bandpass filter 104 is made thick according to the depth in the Z direction of the recessed portion 163, light can be prevented from entering from the side surface 104c of the bandpass filter 104, and the generation of stray light can be suppressed.

In addition, in the spectroscopic module 101, the first wall portion 181a and the second wall portion 181b are in contact with a region on the light outgoing surface 104b of the bandpass filter 104, the region being located outside the clear aperture 140. Accordingly, the function of each of the plurality of bandpass filters 104 is sufficiently exhibited, so that the S/N ratio can be improved.

In addition, in the spectroscopic module 101, each of the width in the X direction of the first wall portion 181a and the width in the X direction of the second wall portion 181b is smaller than the width in the X direction of the light passage opening 108a. Accordingly, the size of the light shielding member 108 can be reduced while the optical path along the X direction is shortened. In addition, since the optical path along the X direction is shortened, the attenuation of signal light can be suppressed, and the S/N ratio can be improved.

In addition, in the spectroscopic module 101, the plurality of bandpass filters 104 are separated from each other with a space interposed therebetween. Accordingly, the arrangement pitch of the plurality of bandpass filters 104 is narrowed while the optical path along the X direction is shortened. Therefore, the size of the spectroscopic module 1 can be reduced. In addition, since the optical path along the X direction is shortened, the attenuation of signal light can be suppressed, and the S/N ratio can be improved.

In addition, the spectroscopic module 101 includes the light shielding member 108 that is formed separately from the light detector 107, as a light shielding portion, and the light passage opening 108a is formed in the light shielding member 108, as a light passage space. Accordingly, the light shielding portion (light shielding member 108) including the plurality of wall portions and light passage spaces can be reliably obtained.

In addition, in the spectroscopic module 101, the plurality of positioning holes 106a are formed in the second support body 106 to extend from the bottom surface 126a of the second recessed portion 126 of the casing 102 to the surface 106b on the one side in the Z direction of the second support body 106. In other words, an internal space of the second recessed portion 126 and the light passage openings 108a communicate with each other through each of the positioning holes 106a. Accordingly, outgas generated in the light passage openings 108a can be released to the internal space of the second recessed portion 126. Therefore, the light passage openings 108a can be less likely to be filled with the outgas.

The present disclosure is not limited to the first embodiment and the second embodiment. For example, in each of the above embodiments, the plurality of beam splitters 3 or 103 are arranged along the first direction (X direction). In addition, in the first embodiment, the plurality of bandpass filters 4 and the like are disposed on the one side in the second direction (Z direction) with respect to the plurality of beam splitters 3. In addition, in the second embodiment, the plurality of bandpass filters 104 and the like are disposed on the one side in the second direction (Z direction) with respect to the plurality of beam splitters 103. Namely, in each of the above embodiments, the second direction (Z direction) is a direction perpendicular to the first direction (X direction), and the third direction (Y direction) is a direction perpendicular to both the first direction (X direction) and the second direction (Z direction); however, the second direction may be a direction intersecting the first direction, and the third direction may be a direction intersecting both the first direction and the second direction. In addition, in the above embodiment, the meaning of "to be in contact with" is not limited to a case where a member and a member are in contact with each other, and includes a case where a film such as adhesive agent is disposed between a member and a member.

In addition, the casing 2 may accommodate at least the plurality of beam splitters 3 and the plurality of bandpass filters 4, and the casing 102 may accommodate at least the plurality of beam splitters 103 and the plurality of bandpass filters 104. In addition, a portion of the casing 2 may be formed of a portion of at least one of the first support body 5, the second support body 6, and the light detector 7, and a portion of the casing 102 may be formed of a portion of at least one of the first support body 105, the second support body 106, and the light detector 107. In addition, the first support body 5 and the second support body 6 may be integrally formed, and the first support body 105 and the second support body 106 may be integrally formed. In addition, in the first embodiment, the light incident surface 4a of each of the bandpass filters 4 is located on the one side in the Z direction from the bottom surface 63a of the recessed portion 63 in which the light shielding member 8 is disposed, but may be located at the same position as that of the bottom surface 63a.

In addition, each of the beam splitters 3 or 103 may be a dichroic mirror that reflects light in different wavelength bands and transmits light other than the light in the reflected wavelength bands. In addition, each of the beam splitters 3 or 103 is not limited to having a plate shape, and may have a block shape. In addition, as long as each of the beam splitters 3 or 103 has a long shape when seen in the thickness direction of each of the beam splitters 3 or 103, each of the beam splitters 3 or 103 may have a polygonal shape, an elliptical shape, or the like as a specific shape. In addition, the plurality of beam splitters 3 or 103 may be formed, for example, by forming at least two dielectric multilayer films on one preform. Namely, a plurality of portions, each of which functions as the beam splitter 3 or 103, may be provided, and the preform on which each of the plurality of portions is disposed is not required to be divided. In addition, the plurality of bandpass filters 4 or 104 may be formed, for example, by forming at least two dielectric multilayer films on one preform. Namely, a plurality of portions, each of which functions as the bandpass filter 4 or 104, may be provided, and the preform on which each of the plurality of portions is disposed is not required to be divided. In addition, the light detector 7 may be a PD array or the like in which the plurality of light receiving regions 7a are formed on one semiconductor substrate, and the light detector 107 may be a PD array or the like in which the plurality of light receiving regions 107a are formed on one semiconductor substrate. In addition, the light detector 7 or 107 may be a photomultiplier tube.

In addition, the second support body 6 is not limited to the configuration of the first embodiment. A support region may be formed in the support portion of the second support body 6 so as to be open to the one side in the Z direction, and the plurality of bandpass filters 4 may be disposed in the support region. Also in the spectroscopic module 1 described above, in the second support body 6, the plurality of bandpass filters 4 are disposed in the support region, the support region formed in the support portion so as to be open to the one side in the Z direction, and in the second support body 6, the one side in the Z direction is the side opposite the side on which the plurality of beam splitters 3 are supported. For this reason, during production of the spectroscopic module 1, for example, even when damage or the like is found in the bandpass filter 4 after the first support body 5 which supports the plurality of beam splitters 3 is attached to the second support body 6, the removal of the first support body 5 from the second support body 6 for the replacement of the bandpass filter 4 is not required. In addition, the timing when the plurality of bandpass filters 4 are attached to the second support body 6 is not dependent on the timing when the first support body 5 which supports the plurality of beam splitters 3 is attached to the second support body 6. Further, when the plurality of bandpass filters 4 are attached to the second support body 6, each of the bandpass filters 4 is visible from the one side in the Z direction. As a result, according to the spectroscopic module 1 described above, the production efficiency can be improved. Incidentally, the above-described example of the support region may be applied to the second support body 106 in the second embodiment.

An example of the support portion in which the support region is formed will be described below. As one example, the second support body 6 illustrated in FIG. 14 includes a support portion 64 in which a support region 64a which is a support surface is formed. The support region 64a is a surface parallel to the Z direction, and is formed to be open to the one side in the Z direction. The fact that the support region 64a is open so as to the one side in the Z direction means that when the support portion 64 is seen from the one side in the Z direction in a state where there is only the second support body 6, any member is not provided up to the support region 64a. The plurality of bandpass filters 4 are disposed in the support region 64a to be arranged along the X direction. The support region 64a is a surface parallel to the Z direction, and is formed in the support portion 64 such that the side surface 4c of each of the bandpass filters 4 is in contact with the support region 64a. In the example illustrated in FIG. 14, in addition to the above-described improvement in production efficiency, as compared with when the support surface perpendicular to the Z direction is formed in the support portion 64, the optical path length between each of the beam splitters 3 and each of the bandpass filters 4 can be shortened, and a loss in amount of light can be reduced. For this reason, the amplification factor of an electric signal in a circuit of the wiring substrate 71 can be suppressed, and the S/N ratio can be further improved. In addition, in the example illustrated in FIG. 14, as compared with when the support surface perpendicular to the Z direction is formed, production can be further facilitated.

Figure 15:
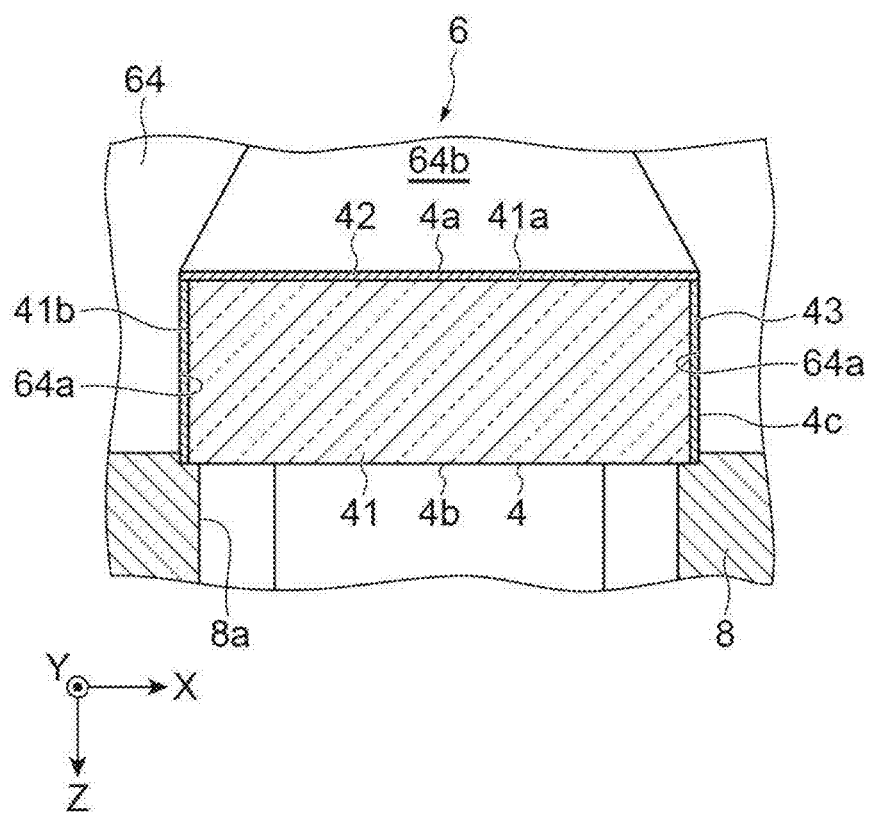
FIG. 15 is a cross-sectional view of a portion of a second support body of a second modification example.

Incidentally, as in the example illustrated in FIG. 15, the support portion 64 may be formed in a portion in which a light passage opening 64b is formed, to be inclined to a center side of the light passage opening 64b. In addition, as in the example illustrated in FIG. 16, the second support body 6 may include the support portion 64 in which a support region 64c linearly extending along the Y direction is formed. The support region 64c is a connecting portion between a light passage opening 64b side surface and a bandpass filter 4 side surface which are inclined at different angles in the support portion 64. The plurality of bandpass filters 4 are disposed in the support region 64c to be arranged along the X direction. The support region 64c is formed in the support portion 64 such that a portion of a corner formed by the light incident surface 4a and the side surface 4c of each of the bandpass filters 4 is in contact with the support region 64c, the portion extending along the Y direction.

Figure 14:
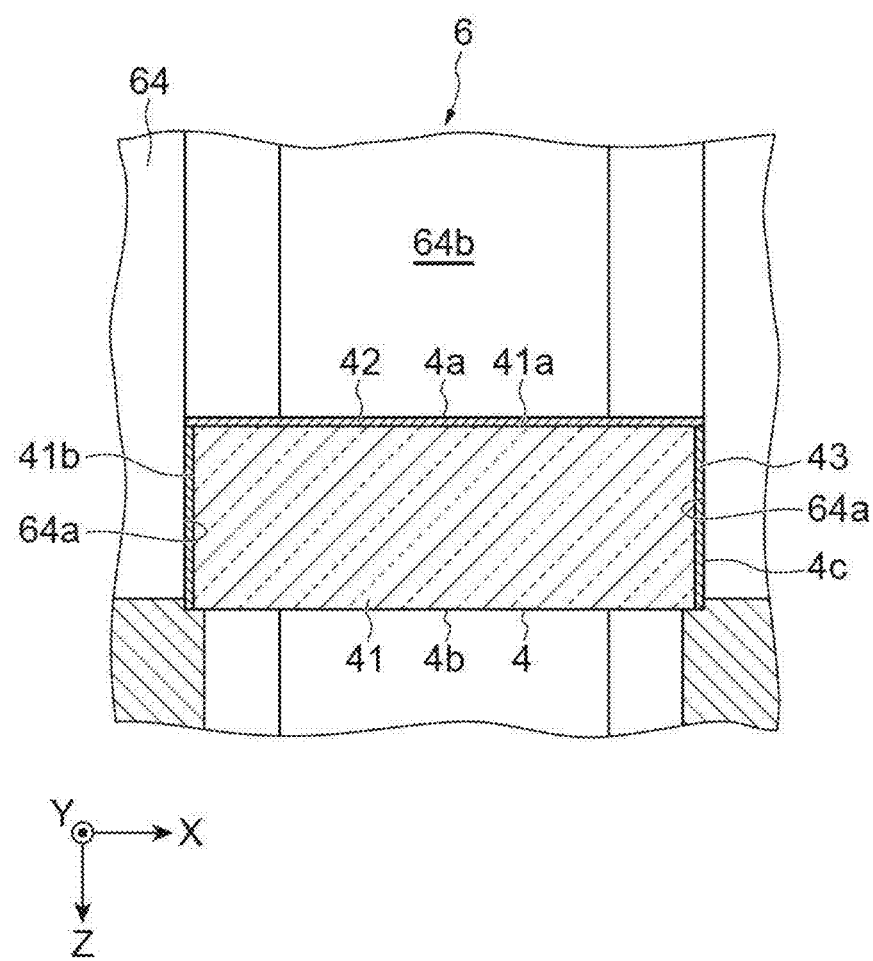
FIG. 14 is a cross-sectional view of a portion of a second support body of a first modification example.
Figure 16:
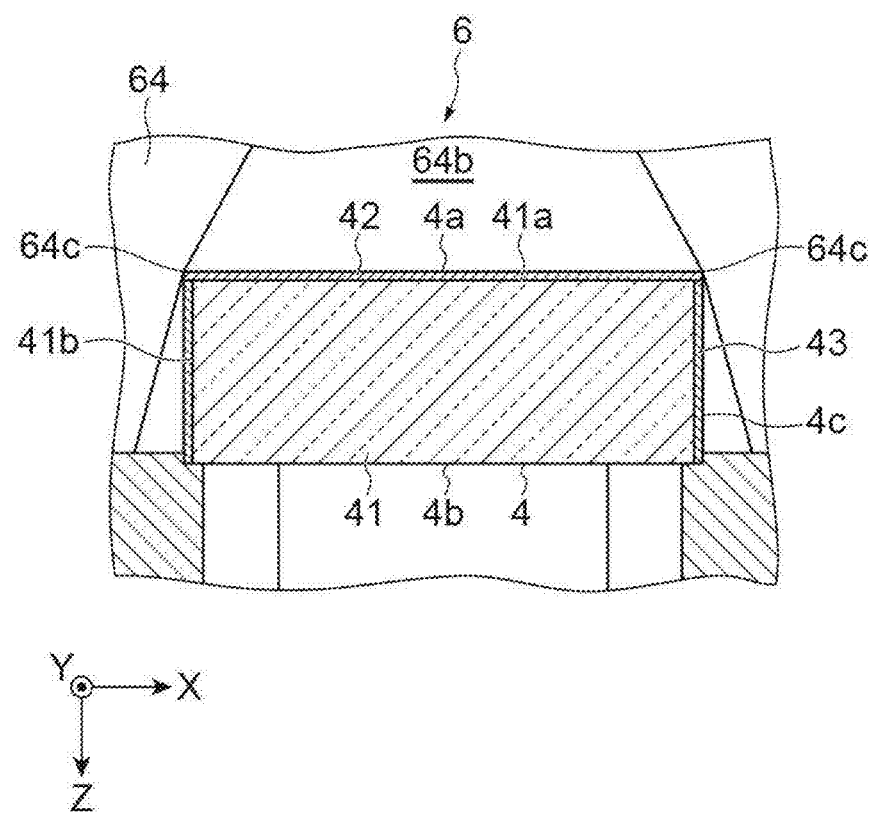
FIG. 16 is a cross-sectional view of a portion of a second support body of a third modification example.

Incidentally, the above-described examples of the support portion 64 illustrated in FIGS. 14, 15, and 16 may be applied to the second support body 106 in the second embodiment.

In addition, in the first embodiment, the casing 2 includes the plurality of positioning holes 2c as a defining portion; however, at least one of the second support body 6 and the casing 2 may include a defining portion that defines the position of the first support body 5 in a plane parallel to both the X direction and the Z direction. The defining portion provided in the second support body 6 and the casing 2 may be, for example, a contact region that is provided in the side surface 92 of the recessed portion 9 so as to be in contact with the first support body 5, the first support body 5 disposed in the recessed portion 9. In addition, the first support body 5 may include a first engagement portion, and the casing 2 may include a second engagement portion engaged with the first engagement portion, as the defining portion. In that case, one of the first engagement portion and the second engagement portion may be formed of a plurality of positioning holes, and the other of the first engagement portion and the second engagement portion may be formed of positioning pins, each of the positioning pins fitted into each of the plurality of positioning holes.

In addition, in the first embodiment, the second support body 6 includes the positioning pins 6a, and the light shielding member 8 includes the positioning holes 8b; however, the second support body 6 may include a first engagement portion, and the light shielding member 8 may include a second engagement portion engaged with the first engagement portion. In that case, one of the first engagement portion and the second engagement portion may be formed of a plurality of positioning holes, and the other of the first engagement portion and the second engagement portion may be formed of positioning pins, each of the positioning pins fitted into each of the plurality of positioning holes.

In addition, when the beam splitter 3 or 103 has a plate shape and has a thickness of 1 mm or less (more preferably, a thickness of 0.5 mm or less), if the number of all the beam splitters 3 or 103 is M (M is a natural number of 2 or more), each of N (N is a natural number of 2 to M) beam splitters 3 or 103 among M beam splitters 3 or 103 may have a plate shape and have a thickness of 1 mm or less (more preferably, a thickness of 0.5 mm or less). Incidentally, all the beam splitters 3 or 103 each may have a plate shape and have a thickness of 1 mm or less (more preferably, a thickness of 0.5 mm or less) (the case of M=N).

In addition, each of the bandpass filters 4 may not be held between the support portion 61 and the light shielding member 8, and each of the bandpass filters 104 may not be held between the support portion 161 and the light shielding member 108. In addition, in the first embodiment, each of the bandpass filters 4 may not be fixed to the second support body 6 with the adhesive agent S11, and in the second embodiment, each of the bandpass filters 104 may not be fixed to the second support body 106 with the adhesive agent S21. In addition, in the first embodiment, each of the light detection elements 72 may not be fixed to the wiring substrate 71 with the adhesive agent S12, and in the second embodiment, each of the light detection elements 172 may not be fixed to the wiring substrate 171 with the adhesive agent S22.

In addition, in the first embodiment, for example, in any of two wall portions 81 adjacent to each other among the plurality of wall portions 81, the two wall portions 81 may be the first wall portion 81a and the second wall portion 81b. In addition, in the second embodiment, for example, in any of two wall portions 181 adjacent to each other among the plurality of wall portions 181, the two wall portions 181 may be the first wall portion 181a and the second wall portion 181b.

In addition, in the first embodiment, the bandpass filter 4 may be in contact with the first wall portion 81a and the second wall portion 81b, and in the second embodiment, the bandpass filter 104 may be in contact with the first wall portion 181a and the second wall portion 181b. For example, in the first embodiment, when seen in the Z direction, the bandpass filter 4 may be in contact with the first wall portion 81a and the second wall portion 81b such that the light passage opening 8a is located on both sides in the Y direction with respect to the bandpass filter 4. In addition, for example, in the second embodiment, when seen in the Z direction, the bandpass filter 104 may be in contact with the first wall portion 181a and the second wall portion 181b such that the light passage opening 108a is located on one side in the Y direction with respect to the bandpass filter 104. In addition, for example, in the first embodiment, the bandpass filter 4 may be in contact with the first wall portion 81a and the second wall portion 81b such that an inner surface of the first wall portion 81a and an inner surface of the second wall portion 81b are in contact with the side surface 4c of the bandpass filter 4. In addition, for example, in the second embodiment, the bandpass filter 104 may be in contact with the first wall portion 181a and the second wall portion 181b such that an inner surface of the first wall portion 181a and an inner surface of the second wall portion 181b are in contact with the side surface 104c of the bandpass filter 104.

In addition, in the first embodiment, the width in the Y direction of the light passage opening 8a may be smaller than the width in the X direction of the light passage opening 8a, or may be the same as the width in the X direction of the light passage opening 8a. In addition, in the second embodiment, the width in the Y direction of the light passage opening 108a may be smaller than the width in the X direction of the light passage opening 108a, or may be the same as the width in the X direction of the light passage opening 108a. In addition, the depth in the Z direction of the recessed portion 163 may be equal to the width in the Z direction of the light passage opening 108a, or may be smaller than the width in the Z direction of the light passage opening 108a.

Figure 17:
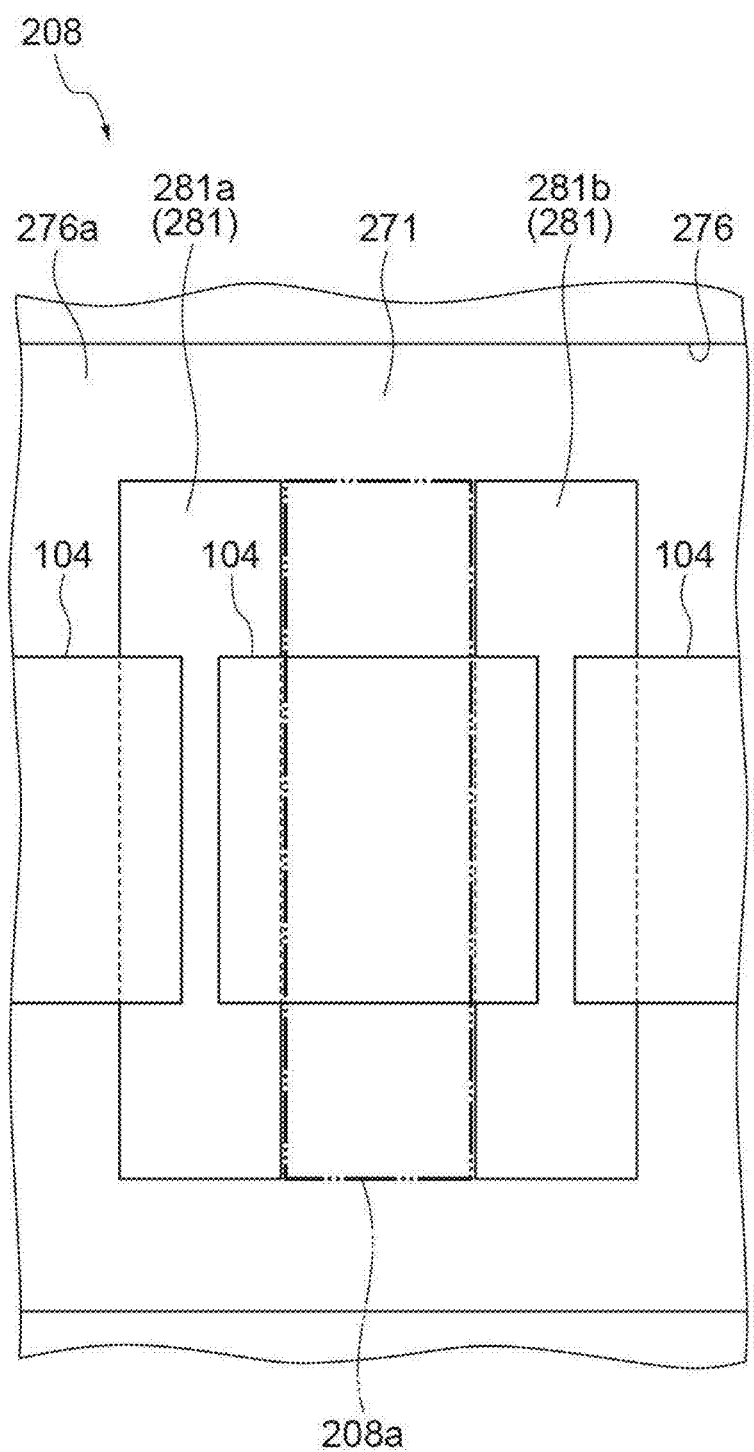
FIG. 17 is a cross-sectional view of a portion of a light shielding member of a fourth modification example.

In addition, in the spectroscopic module 1 of the first embodiment, the light shielding member 8 in which the light passage openings 8a are formed is formed separately from the light detector 7; however, instead of the light shielding member 8 described above, a light shielding portion which is integrally formed with the second support body 6 or the wiring substrate 71 may be disposed between the plurality of bandpass filters 4 and the light detector 7. In the spectroscopic module 101 of the second embodiment, the light shielding member 108 in which the light passage openings 108a are formed is formed separately from the light detector 107; however, instead of the light shielding member 108 described above, a light shielding portion which is integrally formed with the second support body 106 or the wiring substrate 171 may be disposed between the plurality of bandpass filters 104 and the light detector 107. The light shielding portion may include a plurality of wall portions that are arranged along the X direction with a light passage space interposed therebetween. In a spectroscopic module illustrated in FIG. 17, a light shielding portion 208 is integrally formed with a wiring substrate 271. The light shielding portion 208 includes a plurality of wall portions 281. The plurality of wall portions 281 are arranged along the X direction with a light passage space 208a interposed therebetween. The plurality of wall portions 281 extend to the other side in the Z direction from a bottom surface 276a of a recessed portion 276 that is formed in a surface on the other side in the Z direction of the wiring substrate 271. The plurality of wall portions 281 include a first wall portion 281a and a second wall portion 281b. The light passage space 208a is defined by the first wall portion 281a, the second wall portion 281b, and the wiring substrate 271. Specifically, the light passage space 208a is defined by an inner surface of the first wall portion 281a, an inner surface of the second wall portion 281b, and the bottom surface 276a of the recessed portion 276. Incidentally, in FIG. 17, the light passage space 208a is illustrated with an alternate long and two short dashes line. Even in the spectroscopic module of the present modification example, similar to the above embodiments, the first wall portion 281a and the second wall portion 281b adjacent to each other are in contact with the bandpass filter 104 corresponding to the light passage space 208a between the first wall portion 281a and the second wall portion 281b. Therefore, it is possible to suppress occurrence of the crosstalk between the light receiving regions 107a adjacent to each other. In addition, similar to the above embodiments, the width of the light passage space 208a in the Y direction orthogonal to both the X direction and the Z direction is larger than the width in the Y direction of the bandpass filter 104. Accordingly, even when the first wall portion 281a and the second wall portion 281b are lowered in order to avoid a decrease in S/N ratio which is caused by lengthening of the optical path from the bandpass filter 104 to the light receiving region 107a, since the width in the Y direction of the light passage space 208a is large, even if outgas is generated from the adhesive agent S22 or the like, an increase in concentration of the outgas in the light passage space 208a can be suppressed. As a result, even in the present modification example, a deterioration of the plurality of light receiving regions 107a can be suppressed while the S/N ratio is improved. Further, the number of the components of the spectroscopic module is reduced, so that the cost of the spectroscopic module can be reduced.

In addition, the configuration of the separation space is not limited to the configuration of each of the above embodiments. For example, in the first embodiment, the plurality of separation spaces 65a are formed with respect to each of the bandpass filters 4. However, one separation space 65a may be formed in the second support body 6 with respect to each of the bandpass filters 4, or at least one separation space 65a may be formed for the bandpass filter 4 which is specific among the plurality of bandpass filters 4. In addition, for example, in the second embodiment, the plurality of separation spaces 163a are formed with respect to each of the bandpass filters 104. However, one separation space 163a may be formed in the second support body 106 with respect to each of the bandpass filters 104, or at least one separation space 163a may be formed for the bandpass filter 104 which is specific among the plurality of bandpass filters 104. In addition, the separation space may communicate with the light passage opening 8a or 108a, and may be defined by, for example, another recessed portion provided in the second support body 6 or 106. In addition, the separation space may not be formed in the second support body 6 or 106.

According to one aspect of the present disclosure, there is provided a spectroscopic module including: a plurality of beam splitters that are arranged along a first direction; a plurality of bandpass filters that are disposed on one side in a second direction intersecting the first direction with respect to the plurality of beam splitters, each of the plurality of bandpass filters facing each of the plurality of beam splitters; a light detector that is disposed on the one side in the second direction with respect to the plurality of bandpass filters and includes a plurality of light receiving regions, each of the plurality of light receiving regions facing each of the plurality of bandpass filters; and a light shielding portion that is disposed between the plurality of bandpass filters and the light detector. The light shielding portion includes a plurality of wall portions that are arranged along the first direction with a light passage space interposed therebetween, each of a plurality of optical paths from the plurality of bandpass filters to the plurality of light receiving regions passing through the light passage space. A first wall portion and a second wall portion adjacent to each other among the plurality of wall portions are in contact with a bandpass filter among the plurality of bandpass filters, the bandpass filter corresponding to the light passage space between the first wall portion and the second wall portion. A width of the light passage space in a third direction intersecting both the first direction and the second direction is larger than a width in the third direction of the bandpass filter.

In the spectroscopic module, the light shielding portion disposed between the plurality of bandpass filters and the light detector includes the plurality of wall portions that are arranged along the first direction with the light passage space interposed therebetween, and the first wall portion and the second wall portion adjacent to each other among the plurality of wall portions are in contact with the bandpass filter corresponding to the light passage space between the first wall portion and the second wall portion. Accordingly, it is possible to suppress occurrence of the crosstalk of light between the light receiving regions adjacent to each other. In addition, the width of the light passage space in the third direction intersecting both the first direction in which the plurality of beam splitters and the plurality of bandpass filters are arranged and the second direction in which the plurality of bandpass filters and the plurality of light receiving regions face each other is larger than the width in the third direction of the bandpass filter. Accordingly, even when the first wall portion and the second wall portion are lowered in order to avoid a decrease in S/N ratio which is caused by lengthening of the optical path from the bandpass filter to the light receiving region, since the width in the third direction of the light passage space is large, for example, even if adhesive agent is used to fix the components to each other in the light detector and outgas is generated from the adhesive agent, an increase in concentration of the outgas in the light passage space can be suppressed. As a result, according to the spectroscopic module, a deterioration of the plurality of light receiving regions can be suppressed while the S/N ratio is improved.

In the spectroscopic module according to one aspect of the present disclosure, the width in the third direction of the light passage space may be larger than a width in the first direction of the light passage space. Accordingly, even when the width in the first direction of the light passage space is narrowed in order to avoid a decrease in S/N ratio which is caused by lengthening of the optical path along the first direction, the light passage space can be widened.

In the spectroscopic module according to one aspect of the present disclosure, the light detector may include a wiring substrate and a plurality of light detection elements. Each of the plurality of light detection elements may include each of the plurality of light receiving regions. The plurality of light detection elements may be fixed to the wiring substrate with adhesive agent. Accordingly, each of the plurality of light detection elements can be easily and reliably fixed to the wiring substrate. In addition, even when outgas is generated from the adhesive agent, since an increase in concentration of the outgas is suppressed, a deterioration of the light receiving region can be suppressed.

In the spectroscopic module according to one aspect of the present disclosure, each of the plurality of light detection elements may be located inside the light passage space. Accordingly, the optical paths from the plurality of bandpass filters to the plurality of light detection elements can be shortened while the occurrence of optical crosstalk between the light receiving regions adjacent to each other is prevented by separation of the plurality of light receiving regions from each other. Therefore, the S/N ratio can be improved. In addition, even when outgas is generated from the adhesive agent or the like in the light passage space in a state where each of the plurality of light detection elements is surrounded by the light shielding portion, since the light passage space is wide, an increase in concentration of the outgas in the light passage space can be suppressed.

The spectroscopic module according to one aspect of the present disclosure may further include a support body that supports the plurality of bandpass filters. A separation space defined by the support body and the bandpass filter may be formed in the support body. The separation space may communicate with the light passage space. Accordingly, outgas generated in the light passage space can be released to the separation space. Therefore, an increase in concentration of the outgas can be even further suppressed.

In the spectroscopic module according to one aspect of the present disclosure, each of the plurality of bandpass filters may be fixed to the support body with adhesive agent. Accordingly, each of the plurality of bandpass filters can be easily and reliably fixed to the support body. In addition, even when outgas is generated from the adhesive agent, since an increase in concentration of the outgas is suppressed, a deterioration of the light receiving region can be suppressed.

In the spectroscopic module according to one aspect of the present disclosure, a plurality of recessed portions which are open to the one side in the second direction may be formed in the support body. Each of the plurality of recessed portions may accommodates each of the plurality of bandpass filters, and the. The separation space may be defined by an inner surface of a recessed portion which accommodates the bandpass filter among the plurality of recessed portions, and a side surface of the bandpass filter. Accordingly, the separation space communicating with the light passage space can be easily and reliably secured.

In the spectroscopic module according to one aspect of the present disclosure, the separation space may be open to the light passage space. Accordingly, the separation space can reliably communicate with the light passage space while the structure of the support body is simplified.

In the spectroscopic module according to one aspect of the present disclosure, a plurality of separation spaces may be formed in the support body as the separation space corresponding to the bandpass filter. Accordingly, an increase in concentration of outgas can be further suppressed.

In the spectroscopic module according to one aspect of the present disclosure, a depth in the second direction of the recessed portion may be larger than a width in the second direction of the light passage space. Accordingly, the separation space can be widened while the plurality of optical paths from the plurality of bandpass filters to the plurality of light receiving regions are shortened.

In the spectroscopic module according to one aspect of the present disclosure, the first wall portion and the second wall portion may be in contact with a region on a light outgoing surface of the bandpass filter, the region being located outside a clear aperture. Accordingly, the function of each of the plurality of bandpass filters is sufficiently exhibited, so that the S/N ratio can be improved.

In the spectroscopic module according to one aspect of the present disclosure, each of a width in the first direction of the first wall portion and a width in the first direction of the second wall portion may be smaller than a width in the first direction of the light passage space. Accordingly, the size of the light shielding portion can be reduced while an optical path along the first direction is shortened. In addition, since the optical path along the first direction is shortened, the attenuation of signal light can be suppressed, and the S/N ratio can be improved.

In the spectroscopic module according to one aspect of the present disclosure, the plurality of bandpass filters may be separated from each other with a space interposed therebetween. Accordingly, the arrangement pitch of the plurality of bandpass filters is narrowed while the optical path along the first direction is shortened. Therefore, the size of the spectroscopic module can be reduced. In addition, since the optical path along the first direction is shortened, the attenuation of signal light can be suppressed, and the S/N ratio can be improved.

In the spectroscopic module according to one aspect of the present disclosure, the light shielding portion may be formed separately from the light detector. The light passage space may be a light passage opening formed in the light shielding portion. Accordingly, the light shielding portion including the plurality of wall portions and light passage spaces can be reliably obtained.

In the spectroscopic module according to one aspect of the present disclosure, the light detector may include a wiring substrate. The light shielding portion may be integrally formed with the wiring substrate. The light passage space may be defined by the first wall portion, the second wall portion, and the wiring substrate. Accordingly, the number of the components of the spectroscopic module is reduced, so that the cost of the spectroscopic module can be reduced.

What is claimed is:
1. A spectroscopic module comprising:
a plurality of beam splitters that are arranged along a first direction;
a plurality of bandpass filters that are disposed on one side in a second direction intersecting the first direction with respect to the plurality of beam splitters, each of the plurality of bandpass filters facing each of the plurality of beam splitters;
a light detector that is disposed on the one side in the second direction with respect to the plurality of bandpass filters and includes a plurality of light receiving regions, each of the plurality of light receiving regions facing each of the plurality of bandpass filters; and
a light shielding portion that is disposed between the plurality of bandpass filters and the light detector,
wherein the light shielding portion includes a plurality of wall portions that are arranged along the first direction with a light passage space interposed therebetween, each of a plurality of optical paths from the plurality of bandpass filters to the plurality of light receiving regions passing through the light passage space, a first wall portion and a second wall portion adjacent to each other among the plurality of wall portions are in contact with a bandpass filter among the plurality of bandpass filters, the bandpass filter corresponding to the light passage space between the first wall portion and the second wall portion, a width of the light passage space in a third direction intersecting both the first direction and the second direction is larger than a width in the third direction of the bandpass filter, and the light passage space is formed so as to be located between the first wall portion and the second wall portion when seen in the third direction, and located between the bandpass filter and the light detector when seen in the third direction.

2. The spectroscopic module according to claim 1, wherein the width in the third direction of the light passage space is larger than a width in the first direction of the light passage space.

3. The spectroscopic module according to claim 1, wherein the light detector includes a wiring substrate and a plurality of light detection elements, each of the plurality of light detection elements includes each of the plurality of light receiving regions, and the plurality of light detection elements are fixed to the wiring substrate with adhesive agent.

4. The spectroscopic module according to claim 3, wherein each of the plurality of light detection elements is located inside the light passage space.

5. The spectroscopic module according to claim 1, further comprising:

a support body that supports the plurality of bandpass filters, wherein a separation space defined by the support body and the bandpass filter is formed in the support body, and the separation space communicates with the light passage space.

6. The spectroscopic module according to claim 5, wherein each of the plurality of bandpass filters is fixed to the support body with adhesive agent.

7. The spectroscopic module according to claim 5, wherein a plurality of recessed portions which are open to the one side in the second direction are formed in the support body, each of the plurality of recessed portions accommodates each of the plurality of bandpass filters, and the separation space is defined by an inner surface of a recessed portion which accommodates the bandpass filter among the plurality of recessed portions, and a side surface of the bandpass filter.

8. The spectroscopic module according to claim 7, wherein the separation space is open to the light passage space.

9. The spectroscopic module according to claim 8, wherein a plurality of separation spaces are formed in the support body as the separation space corresponding to the bandpass filter.

10. The spectroscopic module according to claim 7, wherein a depth in the second direction of the recessed portion is larger than a width in the second direction of the light passage space.

11. The spectroscopic module according to claim 1, wherein the first wall portion and the second wall portion are in contact with a region on a light outgoing surface of the bandpass filter, the region being located outside a clear aperture.

12. The spectroscopic module according to claim 1, wherein each of a width in the first direction of the first wall portion and a width in the first direction of the second wall portion is smaller than a width in the first direction of the light passage space.

13. The spectroscopic module according to claim 1, wherein the plurality of bandpass filters are separated from each other with a space interposed therebetween.

14. The spectroscopic module according to claim 1, wherein the light shielding portion is formed separately from the light detector, and the light passage space is a light passage opening formed in the light shielding portion.

15. The spectroscopic module according to claim 1, wherein the light detector includes a wiring substrate, the light shielding portion is integrally formed with the wiring substrate, and the light passage space is defined by the first wall portion, the second wall portion, and the wiring substrate.

* * * * *